(12) United States Patent
Itsumi et al.

(10) Patent No.: US 8,749,727 B2
(45) Date of Patent: Jun. 10, 2014

(54) LIQUID CRYSTAL DISPLAY DEVICE

(75) Inventors: Ikumi Itsumi, Osaka (JP); Fumikazu Shimoshikiryoh, Osaka (JP); Mitsuaki Hirata, Osaka (JP); Masae Kitayama, Osaka (JP); Kenichi Hyohdoh, Osaka (JP); Yuki Yamashita, Osaka (JP); Akane Sugisaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 152 days.

(21) Appl. No.: 13/579,946

(22) PCT Filed: Nov. 5, 2010

(86) PCT No.: PCT/JP2010/069745
§ 371 (c)(1),
(2), (4) Date: Aug. 20, 2012

(87) PCT Pub. No.: WO2011/104942
PCT Pub. Date: Sep. 1, 2011

(65) Prior Publication Data
US 2012/0320297 A1  Dec. 20, 2012

(30) Foreign Application Priority Data
Feb. 26, 2010  (JP) ................................ 2010-043425

(51) Int. Cl.
*G02F 1/136* (2006.01)
*G02F 1/1343* (2006.01)

(52) U.S. Cl.
USPC ................ 349/43; 349/38; 349/39; 349/146

(58) Field of Classification Search
USPC ........................................ 349/43.38, 39, 146
See application file for complete search history.

(56) References Cited

U.S. PATENT DOCUMENTS 5,402,141 A * 3/1995 Haim et al. ..................... 345/88
(Continued)

FOREIGN PATENT DOCUMENTS

JP  06-011733 A  1/1994
(Continued)

OTHER PUBLICATIONS

Official Communication issued in International Patent Application No. PCT/JP2010/069745, mailed on Jan. 18, 2011.

*Primary Examiner* — Mike Qi
(74) *Attorney, Agent, or Firm* — Keating & Bennett, LLP

(57) ABSTRACT

The present invention provides a liquid crystal display device which hardly causes image sticking in a panel in which Cgd gradation is performed, even when the pixel capacitances of the picture elements are different from one another. The liquid crystal display device of the present invention is a liquid crystal display device which includes a pair of substrates and a liquid crystal layer sandwiched between the pair of substrates, and is configured such that a pixel is formed by picture elements of a plurality of colors, wherein one of the pair of substrates includes scanning lines, signal lines, storage capacitor lines, thin film transistors connected to both of the scanning lines and the signal lines, and pixel electrodes connected to the thin film transistors; the other of the pair of substrates includes a counter electrode; the pixel electrodes are arranged for the picture elements; a scanning line and a pixel electrode form a gate-drain capacitance; the gate-drain capacitance formed by a pixel electrode with a larger pixel capacitance among the pixel electrodes arranged in one pixel is larger than the gate-drain capacitance formed by a pixel electrode with a smaller pixel capacitance among the pixel electrodes arranged in the one pixel; an overlapping area of each of the pixel electrodes overlapped with the scanning line initially increases in a travelling direction of a scanning line signal but a rate of the increase subsequently decreases, in each of the pixel electrodes respectively arranged for the picture elements of single colors; and rates of increase are different among the pixel electrodes with different pixel capacitances.

9 Claims, 27 Drawing Sheets

(56) References Cited

U.S. PATENT DOCUMENTS

| | | | |
|---|---|---|---|
| 5,811,846 A * | 9/1998 | Miura et al. | 257/291 |
| 5,818,407 A * | 10/1998 | Hori et al. | 345/92 |
| 2003/0227429 A1 | 12/2003 | Shimoshikiryo | |
| 2005/0213015 A1 | 9/2005 | Shimoshikiryo | |
| 2006/0256271 A1 | 11/2006 | Shimoshikiryo | |
| 2007/0019145 A1 * | 1/2007 | Rho et al. | 349/144 |
| 2007/0273683 A1 | 11/2007 | Yamada | |
| 2009/0251627 A1 | 10/2009 | Itsumi et al. | |
| 2012/0274889 A1 * | 11/2012 | Sugisaka et al. | 349/139 |
| 2012/0326954 A1 * | 12/2012 | Itsumi et al. | 345/92 |

FOREIGN PATENT DOCUMENTS

| | | |
|---|---|---|
| JP | 2000-147539 A | 5/2000 |
| JP | 2001-296523 A | 10/2001 |
| JP | 2002-303882 A | 10/2002 |
| JP | 2004-062146 A | 2/2004 |
| JP | 2007-025697 A | 2/2007 |
| WO | 2006/006376 A1 | 1/2006 |
| WO | 2008/081624 A1 | 7/2008 |

* cited by examiner

LIQUID CRYSTAL DISPLAY DEVICE

TECHNICAL FIELD

The present invention relates to a liquid crystal display device. More specifically, the present invention relates to a liquid crystal display device that adopts a driving method using a thin film transistor.

BACKGROUND ART

A liquid crystal display (LCD) device is a device which performs display in such a manner that the optical property of light emitted from a light source is controlled by using a liquid crystal layer, and the like, filled between a pair of substrates, and is used in various fields by taking advantage of its features, such as thin profile, light weight and low power consumption.

In the liquid crystal display device, an alignment state of liquid crystal molecules is changed by applying a voltage to the liquid crystal layer by using a pair of electrodes formed on the substrates, and thereby a polarization state of the light passing through the liquid crystal layer is changed. In the liquid crystal display device, color filters of a plurality of colors are arranged to perform color display. The pair of substrates sandwiching the liquid crystal layer are held by spacers so as to have a uniform gap (cell gap) therebetween and are bonded to each other by a sealing material.

In the liquid crystal display device, sub-pixels of three colors of red (R), green (G) and blue (B) are usually formed. A color filter of each color is arranged for each of the sub-pixels, and color control is performed for each pixel by adjusting light passing through the color filter of each color.

In recent years, there has been made such a contrivance that, in addition to the RGB sub-pixels, a white (W) sub-pixel is arranged in order to increase luminance (see, for example, Patent Literature 1). Further, a method has also been investigated in which the areas of the RGBW sub-pixels are made different for each color so as to suitably adjust color balance (see, for example, Patent Literature 2).

In the liquid crystal display device, pixel electrodes are usually arranged in a matrix form, and each of the pixel electrodes is driven through a switch formed by a thin film transistor (TFT). The TFT is a three terminal field-effect transistor, and a drain electrode of each of the TFTs is connected to the pixel electrode corresponding to the TFT. A gate electrode of each of the TFTs is connected to a gate bus line of each row of the matrix. A source electrode of each of the TFTs is connected to a source bus line of each column of the matrix. A desired image can be obtained by applying an image signal to the source bus line and by sequentially scanning the gate bus line.

Some of the liquid crystal display devices have a multi-gap configuration in which a thickness (cell gap) of the liquid crystal layer is made different for the sub-pixel of each color. However, in the case where a size of the cell gap is made different, a value of capacitance associated with the pixel electrode is changed. Therefore, in order to eliminate the difference in the pixel capacitance between the sub-pixels, it is necessary to make contrivances such as (a) equalizing pixel electrode areas between the sub-pixels and making storage capacitance different for each of the sub-pixels or (b) making the pixel electrode areas different for each of the sub-pixels and equalizing the storage capacitance between the sub-pixels (see, for example, Patent Literature 3).

Further, in the liquid crystal display device, in order to solve a viewing angle dependency problem due to a difference in γ characteristics between the time when the display is viewed in a front direction and the time when the display is viewed in an oblique direction, there is a case where a pixel is divided into a plurality of sub-pixels, and where the γ characteristics are made close to each other (see, for example, Patent Literature 4). The γ characteristics mean gradation dependency of display luminance. That the γ characteristics are different between the time when the display is viewed in the front direction and the time when the display is viewed in the oblique direction means that a gradation display state is changed according to the observation direction. The viewing angle dependency problem due to the γ characteristics can be eliminated in such a manner that a state having different γ characteristics is formed by applying a different voltage to the liquid crystal layer corresponding to each of the sub-pixels.

Further, as a method for forming a spacer, a method has also been tried in which, when color filters are formed in correspondence with RGB sub-pixels, the color filters are also similarly formed at a place where the spacer is to be formed, and are laminated to form the spacer (see, for example, Patent Literature 5). In Patent Literature 5, in order to compensate a change in the capacitance of each pixel due to the spacer formed in the sub-pixel, a method has been investigated which equalizes a capacitance ratio of each of the respective pixels by changing a size of storage capacitor line.

Moreover, an active matrix substrate is disclosed in which a common electrode line is formed parallel to a scanning signal line, and each pixel circuit is formed so that the capacity Cgd between the scanning signal line and the pixel electrode becomes greater as electrically going farther from the scanning signal line drive circuit, in order to eliminate non-uniformity of the level shift of pixel potential generated at the scan signal fall (for example, Patent Literature 6).

CITATION LIST

Patent Literature

Patent Literature 1: JP 2001-296523 A
Patent Literature 2: JP 2007-25697 A
Patent Literature 3: JP 6-11733 A
Patent Literature 4: JP 2004-62146 A
Patent Literature 5: WO 2008/081624
Patent Literature 6: WO 2006/006376

SUMMARY OF INVENTION

Technical Problem

During the investigation of a liquid crystal display device including sub-pixels (hereinafter also referred to as picture elements) of a plurality of colors, the present inventors paid attention to a phenomenon in which, when a pitch is different between picture elements (for example, length between picture elements in a direction along scanning lines), and when a white window screen is displayed on a halftone background for a long time and then a halftone solid screen is displayed, only the color in the portion corresponding to the white window is seen to be different from the color of the background portion.

FIG. 68 is a schematic view showing a state when a white window is displayed on the halftone background, and FIG. 69 is a schematic view showing a state of the halftone solid display when the white window is eliminated. As shown in FIG. 68 and FIG. 69, in the state of the halftone solid display, image sticking due to the display before the elimination of the white window occurs in the region in which the white window was displayed.

The present inventors made various investigations about the cause of occurrence of such phenomenon and found out that the image sticking occurs in the display because, for example, the pixel electrode area or the thickness of the liquid crystal layer is different among picture elements, so that the pixel capacitance is made different for each of the picture elements.

When, for example, the area of the picture element or the thickness of the liquid crystal layer is different for each color, the value of the electrostatic capacitance formed by the pixel electrode is also different for each of the picture elements. FIG. 70 is a schematic view showing signal waveforms of the drain voltages of two pixel electrodes arranged adjacently to each other.

The signal waveforms shown on a left side of FIG. 70 are waveforms associated with a picture element having a larger pixel capacitance in the case of a fixed gate drain capacitance, and the signal waveforms shown on a right side of FIG. 70 are waveforms associated with a picture element having a smaller pixel capacitance in the case of a fixed gate drain capacitance. As shown in FIG. 70, an effective value of the drain voltage (Vd) is different for each picture element. This is because the magnitude of the through-feed voltage ($\Delta$Vd) is different among the picture elements, and because the polarity of drain voltages (Vd(+), Vd(−)) is changed at each timing when the AC driving of the pixel electrode is performed. Since a counter electrode is not formed for each of the pixels, a counter voltage is set to a value common to all the pixels. Therefore, a value of the optimum counter voltage determined by the value of the drain voltage (Vd(+), Vd(−)) after through-feed is set to a value different for each of the picture elements, and hence it is difficult that all the picture elements are suitably driven by a counter voltage common to all the picture elements.

The following will explain an in-plane counter voltage and in-plane correction (Cgd gradation) caused by parasitic capacitance between a gate and a drain. FIG. 71 is a graph showing an in-plane counter voltage distribution 121 (distribution of optimum counter voltage in a direction along a scanning line (gate bus line) in a panel plane) in the case of not providing Cgd gradation in a liquid crystal display device. At a position x=0, the optimum counter voltage is determined by $\Delta$Vd, and as progressed in a scanning line direction, an approach of gating waveform delays and an apparent $\Delta$Vd decreases, and an optimum counter voltage increases. Since the counter voltage is only one value in plane, an optimum counter voltage deviation occurs depending on positions. Normally, as shown in FIG. 71, counter voltage adjustment is made at the center of a screen. Thus, an optimum counter voltage deviation 120 is maximized at end portions. In this case, flicker, degradation of image, or image sticking may occur in displayed images. FIG. 72 is a graph showing a Cgd gradation 122 provided in a liquid crystal display device. FIG. 73 is a graph showing an in-plane counter voltage distribution 123 in a conventional liquid crystal display device in the case of performing Cgd gradation. In a panel having pixel electrodes with the same pixel capacitance among the picture elements, the above-described adjustment achieves favorable in-plane counter voltage distribution.

The following describes a case of performing in-plane correction (Cgd gradation) by parasitic capacitance (Cgd) between a gate and a drain in a panel having a pixel electrode in which the pixel capacitances of the picture elements are different from one another. Correction by Cgd gradation is determined by a correction amount of 1 Step (amount of correction from an initial gate-drain capacitance formed by a scanning line and a pixel electrode to which a scanning signal is initially applied before correction to a gate drain capacitance after correction of a next Step, determined by an overlapping area of the pixel electrode with the scanning line, herein also referred to as Cgd correction amount), and determination for how many pixels the correction is maintained. The fewer the pixels in which the correction is maintained is, the larger the rate of increase of the correction is. In contrast, the more the pixels in which the correction is maintained is, the smaller the rate of increase of the correction is. The Cgd correction amount may be a negative value. In the case where the Cgd correction amount and the number of pixels for which the correction is maintained are determined without considering the difference in the pixel capacitances, the $\Delta$Vd differences among the picture elements increase due to the difference in the pixel capacitance in parts where the correction amount in the panel plane is to some extent large. As a result, the optimum counter voltage may vary among the picture elements.

Further, according to the investigation of the present inventors, it was found that such variation in the optimum counter voltages causes image sticking so as to affect the display.

The present invention has been made in view of the above described circumstances. An object of the present invention is to provide a liquid crystal display device which hardly causes image sticking in a panel in which Cgd gradation is performed, even when the pixel capacitances of the picture elements are different from one another.

Solution to Problem

In order to suppress the image sticking, the present inventors have investigated various methods for making the optimum counter voltage equal among the picture elements, and paid attention to the fact that one of factors required to adjust the optimum counter voltage is $\Delta$Vd described above. When the values of $\Delta$Vd of the picture elements are made close to each other, the optimum counter voltages are also made equal to each other among the picture elements. The value of $\Delta$Vd can be expressed as $\Delta Vd = \alpha \times Vg^{p-p}$. As shown in FIG. 70 described above, the value of $Vg^{p-p}$ represents a gate voltage change at the time when the TFT is turned off. It is necessary to keep the value of $Vg^{p-p}$ at a fixed value to some extent, and hence it is necessary to adjust the value of $\alpha$ in order to change the value of $\Delta$Vd. The value of $\alpha$ is expressed as $\alpha = Cgd/(Cgd+Csd+Ccs+Clc)$. Reference character Csd denotes parasitic capacitance between the source and the drain, reference character Ccs denotes parasitic capacitance between the Cs and the drain, and reference character Clc denotes liquid crystal capacitance. A total value of Cgd+Csd+Ccs+Clc, which is hereinafter also referred to as Cpix, represents the total capacitance (that is, pixel capacitance) connected to the drain of the TFT.

As a result of an extensive investigation on means for effectively adjusting the value of $\alpha$, the present inventors found out that the value of $\alpha$ can be effectively adjusted when the gate drain capacitance formed by a pixel electrode with a larger pixel capacitance is larger than the gate drain capacitance formed by a pixel electrode with a smaller pixel capacitance among a plurality of pixel electrodes disposed in a single pixel.

Regarding a problem of a panel in which Cgd gradation is performed that the difference of the value of $\Delta$Vd between picture elements is larger when a correction amount is determined without considering the difference in the pixel capacitance, the present inventors paid their attention on the overlapping area of the pixel electrode. The present inventors found that the in-plane counter voltage distribution can be effectively adjusted by forming Cgd gradation while the rate of the increase in the overlapping area of the pixel electrode is made different from one another. Meanwhile, in a design of Cgd gradation, normally the correction amount of Cgd (ΔCgd) initially increases in a travelling direction of a scanning line signal but a rate of increase of the amount subsequently decreases due to the characteristic of signal delay in the gate lines.

The present inventors found out that a counter voltage closer to an optimum value for each picture element can be achieved in the following configuration. The gate-drain capacitance formed by a pixel electrode with a larger pixel capacitance among pixel electrodes arranged in one pixel is larger than the gate-drain capacitance formed by a pixel electrode with a smaller pixel capacitance among the pixel electrodes arranged in the one pixel. By taking into consideration of the ΔVd difference based on the difference between the pixel capacitances, a Cdg (α) is appropriately adjusted. Further, an overlapping area of the pixel electrode which is overlapped with the scanning line initially increases in a travelling direction of a signal of the scanning line but a rate of increase subsequently decreases, in each of the pixel electrodes arranged corresponding to single color picture elements, and the rate of increase is different among the pixel electrodes with different pixel capacitances. The Cdg correction amount in each of the pixel electrodes can be appropriately set depending on the areas of the pixel electrodes. Thereby, a counter voltage closer to an optimum value can be provided. This configuration can prevent image sticking from occurring, and thus can solve the above problem. Accordingly, the inventors completed the present invention.

Namely, the present invention relates to a liquid crystal display device which includes a pair of substrates and a liquid crystal layer sandwiched between the pair of substrates, and is configured such that a pixel is formed by picture elements of a plurality of colors, wherein one of the pair of substrates includes scanning lines, signal lines, storage capacitor lines, thin film transistors connected to both of the scanning lines and the signal lines, and pixel electrodes connected to the thin film transistors; the other of the pair of substrates includes a counter electrode; the pixel electrodes are arranged for the picture elements; a scanning line and a pixel electrode form a gate-drain capacitance; the gate-drain capacitance formed by a pixel electrode with a larger pixel capacitance among the pixel electrodes arranged in one pixel is larger than the gate-drain capacitance formed by a pixel electrode with a smaller pixel capacitance among the pixel electrodes arranged in the one pixel; an overlapping area of each of the pixel electrodes overlapped with the scanning line initially increases in a travelling direction of a scanning line signal but a rate of the increase subsequently decreases, in each of the pixel electrodes respectively arranged for the picture elements of single colors; and the rates of the increase are different among the pixel electrodes with different pixel capacitances.

The liquid crystal display device of the present invention includes a pair of substrates, a liquid crystal layer sandwiched between the pair of substrates, and is configured such that a pixel is formed by picture elements of a plurality of colors. The pair of substrates may be formed of an array substrate as one of the substrates and a color filter substrate as the other. The picture elements of a plurality of colors are achieved by color filters respectively arranged in the picture elements. Various colors can be displayed by adjusting the balance of the colors.

The one of the pair of substrates includes scanning lines (hereinafter, also referred to as gate bus lines), signal lines (hereinafter, also referred to as source bus lines), storage capacitor lines (hereinafter, also referred to as Cs bus lines), thin film transistors connected to both of the scanning lines and the signal lines, and pixel electrodes respectively connected to the thin film transistors. A drain electrode of each of the TFTs is connected to the pixel electrode corresponding to the TFT. A gate electrode of each of the TFTs is connected to a gate bus line of each row. A source electrode of each of the TFTs is connected to a source bus line of each column. A desired image can be generated by supplying an image signal to the source bus lines while applying a voltage to the gate bus lines at a predetermined timing.

In the above-described configuration, it is necessary that the scanning lines, the signal lines, the storage capacitor lines, the thin film transistors, and the pixel electrode are arranged via insulating films, or the like, at certain intervals so as to be electrically isolated from one another. Further, the pixel electrode and the counter electrode are arranged to be separated from each other via the liquid crystal layer. Therefore, a certain amount of electrostatic capacitance is formed between each of the lines and each of the electrodes, and between the electrodes. Specifically, the scanning line and the pixel electrode form a gate-drain capacitance (Cgd), the signal line and the pixel electrode form a source-drain capacitance (Csd), the storage capacitor line and the pixel electrode form a storage capacitance (Ccs), and the pixel electrode and the counter electrode form a liquid crystal capacitance (Clc).

The other of the pair of substrates includes the counter electrode. Since an electric field is formed between the pixel electrode and the counter electrode, and since each of the pixel electrodes is individually controlled by the thin film transistor, the orientation of the liquid crystal can be controlled for each of the picture elements, and thereby the whole screen can be precisely controlled.

The pixel electrodes are arranged for the picture elements, and the gate-drain capacitance formed by a pixel electrode with a larger pixel capacitance among the pixel electrodes arranged in one pixel is larger than the gate-drain capacitance formed by a pixel electrode with a smaller pixel capacitance among the pixel electrodes arranged in the one pixel. This arrangement makes it possible to effectively control the value of α before setting a Cgd gradation. A rate of increase of the overlapping area of the pixel electrode overlapped with the scanning line, which increases from the pixel electrode to which a scanning line signal is initially applied along travel of the scanning line signal, is different among the pixel electrodes with different pixel capacitances. The overlapping area, namely, the correction amount of Cgd correlates with the size of the pixel capacitance. When a pixel electrode with a larger pixel capacitance is allowed to have a larger overlapping area, and a pixel electrode with a smaller pixel capacitance is allowed to have a smaller overlapping area, the gate-drain capacitances (Cgd) formed by the scanning lines and the pixel electrodes are favorably adjusted based on the electric characteristics specific to circuit substrates. Thereby, variation in the optimum counter voltages among the picture elements can be suppressed.

The above statement "an overlapping area of each of the pixel electrodes overlapped with the scanning line initially increases in a travelling direction of a scanning line signal but a rate of the increase subsequently decreases, in each of the pixel electrodes respectively arranged for the picture elements of single colors" means as follows: In the case of a liquid crystal display device using the three primary colors of RGB, for example, an overlapping area of the picture electrode overlapped with the scanning line initially increases in a travelling direction of a scanning line signal but a rate of increase subsequently decreases in the pixel electrode corresponding to the red picture element, initially increases in a travelling direction of a scanning line signal but a rate of increase subsequently decreases in the pixel electrode corresponding to the green picture element, and initially increases in a travelling direction of a scanning line signal but a rate of increase subsequently decreases in the pixel electrode corresponding to the blue picture element. The above statement "initially increases in a travelling direction of a scanning line signal" means that the rate of increase is initially (for example, at the time when a signal travels from the position x=0 on a horizontal axis, where the signal is input to the scanning line, on a panel plane surface to a travelling direction of the signal) a positive value. The above statement "a rate of increase subsequently decreases" means that the rate of increase decreases to, in some cases, a negative value. For example, in the case of a liquid crystal display device with single-sided scanning signal lines, the overlapping area normally decreases (rate of increase turns to a negative value) near a non-input end of the panel, and in the case of a liquid crystal display device with two-sided scanning signal lines, the overlapping area normally decreases (rate of increase turns to a negative value near the center of the panel) near the center of the panel. Meanwhile, the gate drain capacitance can be controlled by adjustment of the width of the TFT channel, adjustment of the overlapping area of the gate bus line and the drain electrode, adjustment of the overlapping area of the pixel electrode and the gate bus line, and the like.

The configuration of the liquid crystal display device of the present invention is not especially limited as long as it essentially includes such components. The following will describe preferable embodiments of the liquid crystal display device of the present invention in detail.

Preferably, a pixel electrode with a larger pixel capacitance among the pixel electrodes arranged in one pixel is connected to a thin film transistor with a larger channel width among the pixel electrodes arranged in the one pixel. In other words, a pixel electrode with a smaller pixel capacitance among the pixel electrodes arranged in one pixel is connected to a thin film transistor with a smaller channel width among the thin film transistors arranged in the one pixel.

A channel region of TFT is a part not overlapped with a source electrode and a drain electrode in a plan view of the semiconductor layer electrically that is disposed between the source electrode and the drain electrode. In other words, the channel region of TFT is a region that is not impurity doped.

The size of the channel region of TFT has a large influence on the characteristics of the TFT. The larger the width of the channel region is, the better the current characteristics becomes. Change in the size of the channel region has an influence on the value of the Cgd which is a component of Cpix.

The channel width does not refer to a distance (hereinafter, also referred to as channel length) between the source electrode and the drain electrode, but refers to a width of a part where the source electrode and the drain electrode face each other in a plan view. The channel width correlates with the size of the pixel capacitance, and the size of the pixel capacitance correlates with the area of the pixel electrode. variation in the values of $\alpha$ among the picture elements before setting Cgd gradation can be favorably suppressed by allowing a TFT with a larger channel width to connect to a pixel electrode with a larger area, and allowing a TFT with a smaller channel width to connect to a pixel electrode with a smaller area, based on the characteristics of TFT.

A pixel electrode with a larger pixel capacitance among the plurality of pixel electrodes arranged in one pixel preferably has a larger overlapping area with the scanning line of the picture electrode among the plurality of pixel electrodes arranged in the one pixel. In other words, a pixel electrode with a smaller pixel capacitance among the plurality of pixel electrodes arranged in one pixel has a smaller overlapping area with the scanning line of the pixel electrode among a plurality of thin film transistors arranged in the one pixel. The above configuration can also preferably suppress variation in the values of $\alpha$ among the picture elements before setting Cgd gradation. Moreover, in terms of appropriately control the value of $\alpha$, an overlapping area of the pixel electrode with a larger pixel capacitance overlapped with the scanning line is preferably different from an overlapping area of the pixel electrode with a smaller pixel capacitance overlapped with the scanning area. Furthermore, in terms of appropriately control the value of $\alpha$, an overlapping area of the pixel electrode with a larger pixel capacitance overlapped with the storage capacitor line is preferably different from an overlapping area of the pixel electrode with a smaller pixel capacitance overlapped with the storage capacitor line.

The area of the pixel electrode with a larger pixel capacitance is, for example, different in size from the area of the pixel electrode having a smaller pixel capacitance. Application of the structure of the present invention in the above embodiment makes it possible to sufficiently exert the effects of the present invention. In the above embodiment, the area of the pixel electrode with a larger pixel capacitance is normally larger than the area of the pixel electrode with a smaller pixel capacitance.

For example, the liquid crystal layer overlapped with the pixel electrode with a larger pixel capacitance differs in thickness from the liquid crystal layer overlapped with the pixel electrode with a smaller pixel capacitance. Application of the structure of the present invention in the above embodiment makes it possible to sufficiently exert the effects of the present invention. In the above embodiment, the liquid crystal layer overlapped with the pixel electrode with a larger pixel capacitance normally has a smaller thickness than the liquid crystal layer overlapped with the pixel electrode with a smaller pixel capacitance.

It is preferred that the signal line and the pixel electrode form a source-drain capacitance (Csd), that the storage capacitor line and the pixel electrode form a storage capacitance (Ccs), that the pixel electrode and the counter electrode form a liquid crystal capacitance (Clc), that ratios of the gate-drain capacitance to the total of the gate-drain capacitance, the source-drain capacitance, the storage capacitance, and the liquid crystal capacitance (the value of this ratio of the gate-drain capacitance is hereinafter set as $\alpha$) are different among the picture elements of the plurality of colors, and that, the difference between the largest ratio of the gate-drain capacitance and the smallest ratio of the gate-drain capacitance, among the ratios of the gate-drain capacitances for each picture element with different colors, is 10% or less of the smallest ratio of the gate-drain capacitance, and is more preferably 5% or less.

It is preferred that the values of $\alpha$ of the picture elements in this case are close to each other. Further, when the values of $\alpha$ are set in the above-described range, the difference between the optimum counter voltages of the respective picture elements can be eliminated so that the image sticking can be sufficiently suppressed.

It is preferred that the signal line and the pixel electrode form a source drain capacitance, that the storage capacitor line and the pixel electrode form a storage capacitance, that the pixel electrode and the counter electrode form a liquid crystal capacitance, and that a response coefficients ("Cpix (min)/Cpix(max)") calculated, in the one picture element, from ratios of the minimum value of the total of the gate-drain capacitance, the source-drain capacitance, the storage capacitance, and the liquid crystal capacitance, with respect to the maximum value of the total of the gate-drain capacitance, the source-drain capacitance, the storage capacitance, and the liquid crystal capacitance are different among the picture elements of the plurality of colors, and that, the difference between the largest response coefficient and the smallest response coefficient is preferably 5% or less of the smallest response coefficient, among the response coefficients respectively obtained for each picture elements with different colors.

It is preferred that each of the pixel electrode is divided into two or more pieces in one picture element, that the thin film transistors are connected to the divided pieces of the pixel electrodes, that the storage capacitor lines are overlapped with each of the pixel electrodes, and that a polarity of a voltage is inverted at a regular time interval. Hereinafter, the method in which one picture element is controlled by using a plurality of divided pieces (called also sub-pixel electrodes) of the pixel electrode as described above is also referred to as a multi-driving method. When a plurality of sub-pixel electrodes are arranged in the same picture element and are respectively driven by different effective voltages, a state where different γ characteristics are mixed is formed, so that the visual angle dependency based on the γ characteristics can be eliminated. Further, an increase in the number of extra lines can be prevented by driving the sub-pixel electrodes by the multi-driving method using the change in the voltage of the storage capacitor line.

It is preferred that the signal line and the pixel electrode form a source-drain capacitance (Csd), that the storage capacitor line and the pixel electrode form a storage capacitance (Ccs), that the pixel electrode and the counter electrode form a liquid crystal capacitance (Clc), that ratios of the storage capacitance to a total of the gate-drain capacitance, the source-drain capacitance, the storage capacitance, and the liquid crystal capacitance (the value of this ratio of the storage capacitance is hereinafter set as K) are different among the picture elements of the plurality of colors, and that, the difference between the largest ratio of the storage capacitance and the smallest ratio of the storage capacitance, among the ratios of the storage capacitance for each picture element with different colors, is preferably 1.0% or less of the smallest ratio of the storage capacitance.

The above-described preferable embodiment is favorably applicable to liquid crystal display devices of RGB (red (R), green (G), blue (B)) three-primary-color type, and liquid crystal display panels of RGBY (yellow (Y) picture element is added to RGB three-primary-color) four-primary-color type, of RGBC (cyan (C) picture element is added to RGB three-primary-color) four-primary-color type, of RGBW ((W) picture element is added to RGB three-primary-color) four-primary-color type, and of multiple-color type of more than four colors essentially including RGBY, RGBC, RGBW, or the like.

Preferable examples of the embodiment of four-or-more-primary-color type include a display device having a display surface formed of a pixel including sub-pixels of red, green, blue and yellow, in which the sub-pixel(s) of red and/or blue have/has a larger aperture area than other sub-pixels (embodiment in which the aperture area of the red sub-pixel is the largest, embodiment in which the aperture area of the blue sub-pixel is the largest, or embodiment in which both the aperture areas of the red sub-pixel and the blue sub-pixel are the largest, among all the sub-pixels) or in which the sub-pixel(s) of green and/or yellow have-has a smaller aperture area than other sub-pixels (embodiment in which the aperture area of the green sub-pixel is the smallest, embodiment in which the aperture area of the yellow sub-pixel is the smallest, or embodiment in which both the aperture areas of the green sub-pixel and the yellow sub-pixel are the smallest, among all the sub-pixels). Yellow may be substituted with cyan, or both yellow and cyan may be included in the above example. Moreover, the above pixel may include sub-pixels of red and/or blue having different color characteristics from one another.

In four or more-primary-color liquid crystal display devices, in the case where the number of primary colors used for display is increased, the visibility is deteriorated especially due to reduced brightness of red color. Also, in the case where a high color temperature light is used to control the color tone of white display, the brightness of red color is further reduced, thereby further deteriorating the visibility. The above preferable embodiment can display bright red color, and thus the visibility can be improved. The above advantage and the structure of the present invention together synergically enhance the effects of the present invention.

The above embodiments may be employed in appropriate combination as long as the combination is not beyond the spirit of the present invention.

Advantageous Effects of Invention

With the liquid crystal display device of the present invention, the variation in the optimum counter voltages is controlled among the picture elements in a panel in which in-plane correction (Cgd gradation) caused by parasitic capacitance between a gate and a drain is performed, and hence the generation of image sticking can be suppressed.

DESCRIPTION OF EMBODIMENTS

Figure 1:
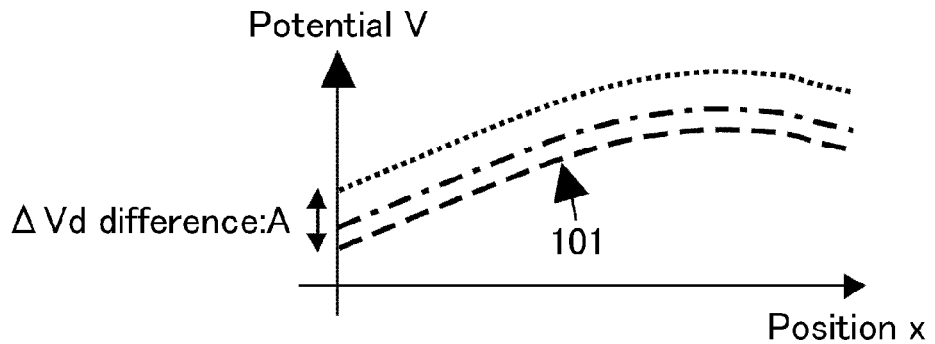
FIG. 1 is a graph showing in-plane counter voltage distributions of RGB three primary colors in a liquid crystal display device of Embodiment 1 in the case of not performing Cgd gradation.

Herein, the overlapping area of the pixel electrode with lines includes an overlapping area of the drain electrode overlapped with lines. The overlapping area of the pixel electrode with scanning lines includes an overlapping area of the pixel electrode overlapped with the gate electrode. The overlapping area of the pixel electrode with signal lines includes an overlapping area of the pixel electrode overlapped with the source electrode.

The present invention will be mentioned in more detail referring to the drawings in the following embodiments, but is not limited to these embodiments.

Embodiment 1

FIG. 1 is a graph showing in-plane counter voltage distributions of RGB three primary colors in a liquid crystal display device of Embodiment 1 in the case of not performing Cgd gradation.

In FIG. 1, a dashed-dotted line shows an in-plane counter voltage distribution 101 of G (green), a dotted line shows an in-plane counter voltage distribution 101 of B (Blue), and a dashed line shows an in-plane counter voltage distribution 101 of R (red). The position x shows a position on a scanning signal side when the position of a horizontal axis on a panel plane surface where the signal is input to the scanning line is set to 0.

As shown in FIG. 1, in the case where there is a difference A in ΔVd among the picture elements, and Cgd gradation is not performed, the in-plane counter voltage distributions 101 of the RGB primary colors are different from one another. In contrast, Figures (FIG. 26 to FIG. 29, FIG. 31, and FIG. 32) in the case of performing Cgd gradation are described below.

Figure 2:
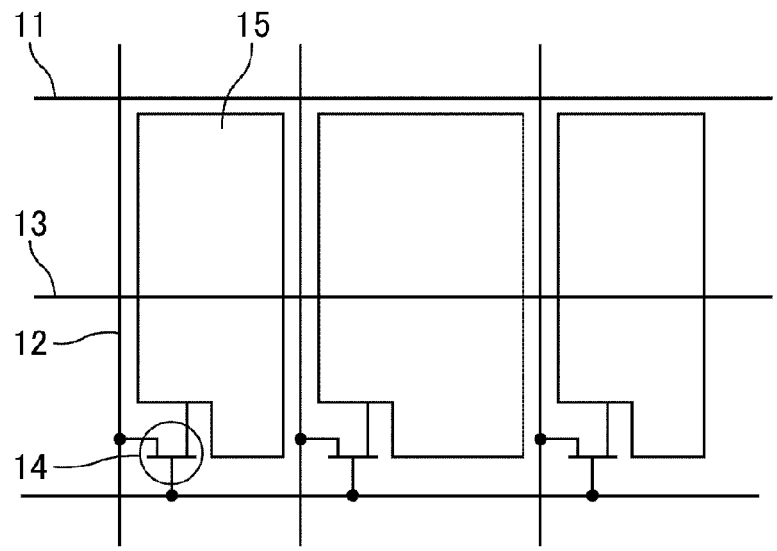
FIG. 2 is a schematic plan view showing an arrangement configuration of pixel electrodes, TFTs and various lines of a liquid crystal display device of Embodiment 1.

FIG. 2 is a schematic plan view showing an arrangement configuration of pixel electrodes, TFTs and various lines of the liquid crystal display device of Embodiment 1. As shown in FIG. 2, one pixel electrode is arranged for one picture element in Embodiment 1. Also, one pixel is configured by a plurality of picture elements, and hence each of the picture elements is individually controlled to control each pixel, and to further control the whole display of the liquid crystal display device.

The liquid crystal display device of Embodiment 1 includes gate bus lines 11 extending in a row direction (lateral direction), and source bus lines 12 extending in a column direction (longitudinal direction). Further, the liquid crystal display device includes a TFT 14 connected to both of the gate bus line 11 and the source bus line 12. The TFT 14 is also connected to a pixel electrode 15. Further, the liquid crystal display device includes a Cs bus line 13 which overlaps at least a part of the pixel electrode 15. For example, as shown in FIG. 2, the Cs bus line 13 is formed to extend in the row direction so as to cross the center portion of the pixel electrode 15.

Figure 3:
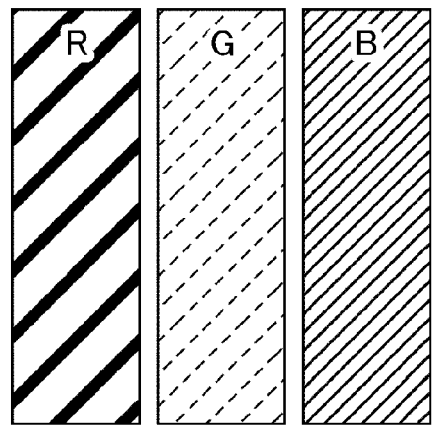
FIG. 3 is a schematic plan view when color filters in Embodiment 1 are arranged in a stripe shape.
Figure 4:
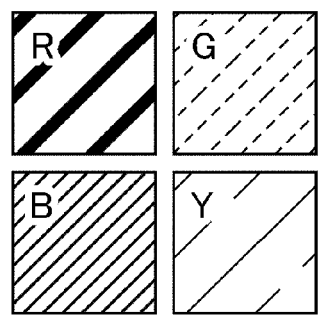
FIG. 4 is a schematic plan view when the color filters in Embodiment 1 are arranged in a two-by-two matrix shape.

In Embodiment 1, a kind of color filter is arranged for one picture element. Examples of the kinds, the number, and the arrangement order of colors of the picture elements configuring a pixel include, but are not limited in particular to, combinations such as RGB, RGBY, RGBC, and RGBW. The color of a picture element is determined by a color filter. Examples of arrangement configurations of color filters include a stripe arrangement, as shown in FIG. 3, in which color filters are formed to extend in the longitudinal direction regardless of the boundary of the pixel electrode, and a two-by-two matrix arrangement having four colors, as shown in FIG. 4, in which two color filters are arranged in each of the row direction and the column direction.

Figure 5:
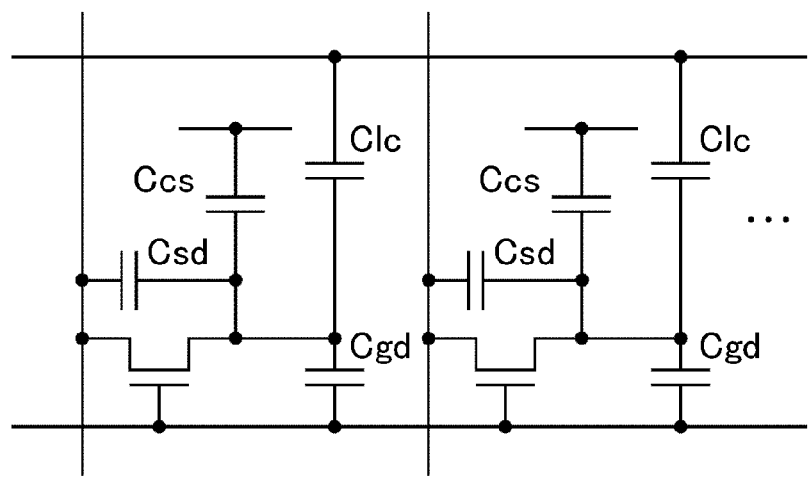
FIG. 5 is an equivalent circuit diagram in the liquid crystal display device of Embodiment 1.

FIG. 5 is an equivalent circuit diagram in the liquid crystal display device of Embodiment 1. In Embodiment 1, a circuit pattern is formed for each picture element (sub-pixel), and hence circuit patterns for two picture elements are illustrated in FIG. 5.

A liquid crystal capacitance Clc is formed by the pixel electrode and the counter electrode which are arranged to face each other via the liquid crystal layer. The value of Clc is dependent on an effective voltage (V) applied to the liquid crystal layer by the pair of electrodes. A storage capacitance Ccs is formed by the pixel electrode and the Cs bus line (storage capacitor line) which are arranged to face each other via an insulating layer. A gate-drain capacitance Cgd is formed by the pixel electrode and the gate bus line (scanning line) which are arranged to face each other via an insulating layer. A source-drain capacitance Csd is formed by the pixel electrode and the source bus line (signal line) which are arranged to face each other via an insulating layer.

The TFT (thin film transistor) includes a semiconductor layer made of silicon, and the like, and three electrodes of a gate electrode, a source electrode, and a drain electrode. The pixel electrode is connected to the drain electrode of the TFT. The gate electrode of the TFT is connected to the gate bus line, and the source electrode of the TFT is connected to the source bus line.

A scanning signal supplied to the gate bus line in a pulse-like manner at a predetermined timing is applied to each of the TFTs at a predetermined timing (by line-sequential writing, every other line writing, two-line simultaneous writing, or the like). Then, an image signal supplied from the source bus line is applied to the pixel electrode connected to the TFT which is turned on for a predetermined time period by the input of the scanning signal.

The image signal having a predetermined level, which is written in the liquid crystal layer for each of the picture elements, is held, for a predetermined time period, between the pixel electrode with the image signal applied thereto and the counter electrode facing the pixel electrode. After the image signal is applied, the image signal held between the pixel electrode and the counter electrode may leak. In order to prevent this leakage, the storage capacitance Ccs is formed in parallel with the liquid crystal capacitance Clc formed between the pixel electrode and the counter electrode.

In Embodiment 1, as shown in FIG. 2, the lateral lengths of the pixel electrodes 15 are different from each other, and the longitudinal lengths of the pixel electrodes 15 are the same. Therefore, the areas of the pixel electrodes 15 are different from each other.

In the following, examples of arrangement configurations (Examples 1 to 6) of three color filters of red, green and blue, and of four color filters of red, green, blue and yellow are specifically described.

Example 1

Figure 6:
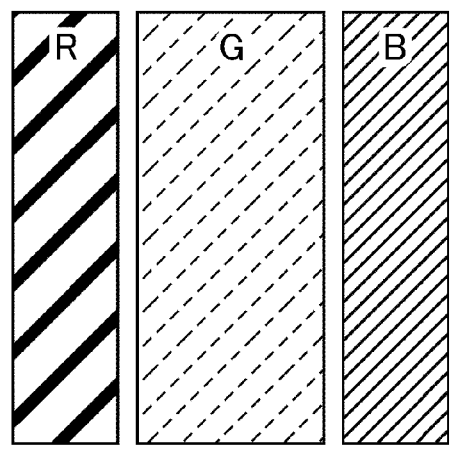
FIG. 6 is a schematic plan view of the color filters for each pixel of Example 1.

FIG. 6 is a schematic plan view of color filters for a pixel of Example 1. As shown in FIG. 6, three color filters of red (R), green (G) and blue (B) are arranged in Example 1. The color filters in Example 1 are arranged in a stripe shape, and picture elements of the same colors are arranged in the longitudinal direction of the panel.

The pixel electrodes of the respective three colors of red, green and blue are formed to have the same longitudinal length but to have different lateral lengths (picture element pitches). Generally, the pixel electrode having a larger picture element pitch has a larger picture element area.

Specifically, the pitch width of the green picture element is larger than the pitch width of the red picture element, and is larger than the pitch width of the blue picture element. The pitch width of the red picture element is the same as the pitch width of the blue picture element. The area of the green picture element is larger than the area of the red picture element, and is larger than the area of the blue picture element.

In the case where all the picture elements of red, green and blue are not formed to have the same pitch width, and the ratio of the green picture element is increased, higher transmissivity is obtained as compared with the case where the ratios of these picture elements are the same. Meanwhile, when the area of the pixel electrode is different among the picture elements, the color balance may be deteriorated, but the color balance can be adjusted by controlling the backlight. Specifically, the color balance can be adjusted, such as by controlling the backlight signal, and by changing the phosphor ratio of the light source used for the backlight.

In Example 1, the balance between the values of $\alpha=Cgd/(Cgd+Csd+Ccs+Clc)$ of the picture elements is adjusted by using the channel width of the TFT. Specifically, a TFT having a larger channel width is arranged for the pixel electrode having a larger area. Therefore, the channel width of the TFT arranged for the green picture element is larger than the channel width of the TFT arranged for the red picture element, and is larger the channel width of the TFT arranged for the blue picture element.

Thereby, it is possible to easily adjust, for each of the picture elements, the balance of the gate-drain capacitance (Cgd) formed between the gate bus line and the pixel electrode, the source-drain capacitance (Csd) formed between the source bus line and the pixel electrode, the storage capacitance (Ccs) formed between the Cs bus line and the pixel electrode, and the liquid crystal capacitance (Clc) formed between the pixel electrode and the counter electrode.

FIG. 7 to FIG. 11 are schematic plan views respectively showing an example of means for making the channel width d (d1 to d5) of the TFT different among the picture elements in Example 1. As shown in FIG. 7 to FIG. 11, a TFT 14 is connected to each of a gate bus line 11 and a source bus line 12. The TFT 14 includes, as components, a semiconductor layer formed of silicon, and the like, a source electrode 22 extended from a part of the source bus line 12, a drain electrode 23 that supplies an image signal from the source bus line 12 to the pixel electrode via the semiconductor layer, and a gate electrode that is a region of the gate bus line 11, which region overlaps the semiconductor layer.

The drain electrode 23 is extended toward the center of the picture element, and is formed to have a certain spread. A contact hole 24 is formed through the insulating layer formed on a portion 23a having the certain spread, and the drain electrode 23 and the pixel electrode are electrically connected to each other via the contact hole 24.

The portion 23a of the drain electrode 23, which portion has the certain spread, can form a storage capacitance together with the Cs bus line arranged under the portion 23a via the insulating layer. The Cs bus line is extended in parallel with the gate bus line 11.

The semiconductor layer provided in the TFT 14 overlaps both of the source electrode 22 and the drain electrode 23. The region of the semiconductor layer, which region overlaps the source electrode 22, is a source region, and the region of the semiconductor layer, which region overlaps the drain electrode 23, is a drain region. Further, the region of the semiconductor layer, which region does not overlap both of the source electrode 22 and the drain electrode 23, and which region is located between the source electrode 22 and the drain electrode 23 in a plan view, is a channel region 21. Therefore, the semiconductor layer has three regions of the source region, the channel region 21, and the drain region.

The channel region 21, which overlaps the gate bus line 11, enables an image signal to be supplied from the source electrode 22 to the drain electrode 23 only when a scanning signal is inputted into the gate bus line 11. Since the length (distance between the source electrode 22 and the drain electrode 23) of the channel region 21 is determined to be an appropriate value to some extent, it is not preferred to change the length of the channel region 21 for each of the picture elements, but the width d of the channel region 21 can be adjusted. When the width d of the channel region 21 with respect to the length of the channel region 21 is expanded, the conductivity of the TFT 14 can be further improved. Therefore, in Example 1, the channel width d in the green picture element is formed to be larger than the channel width d in the red and blue picture elements.

Thereby, the value of the gate-drain capacitance (Cgd) formed between the gate bus line and the pixel electrode is changed, and hence, by the use of this change, the values of the optimum counter voltages in the picture elements are respectively adjusted so as to become close to each other.

Figure 7:
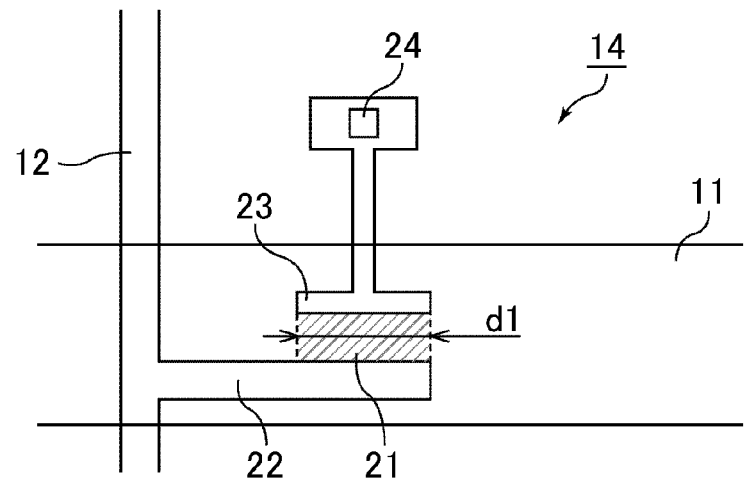
FIG. 7 is a schematic plan view showing a first example of TFT in which a size of channel width is adjusted.

FIG. 7 is a schematic plan view showing a first example of TFT in which the size of channel width is adjusted. The channel region 21 of the TFT in FIG. 7 is formed between the drain electrode 23 and the source electrode 22, and has the channel width of d1. The value of $\alpha$ can be adjusted among the picture elements by changing the size of d1 for each of the picture elements.

Figure 8:
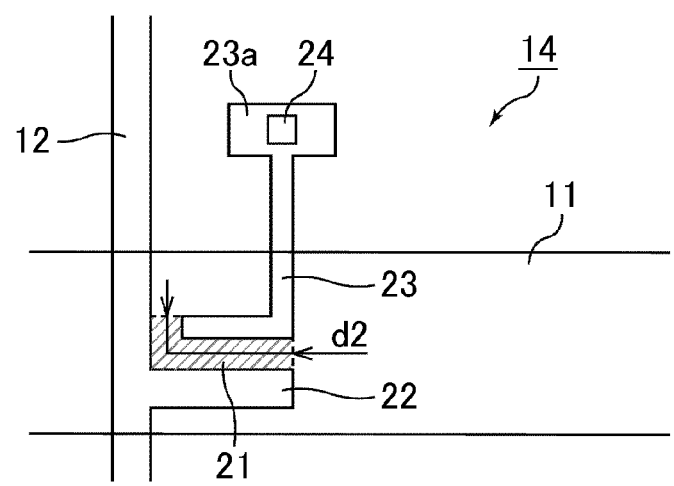
FIG. 8 is a schematic plan view showing a second example of TFT in which the size of channel width is adjusted.
Figure 9:
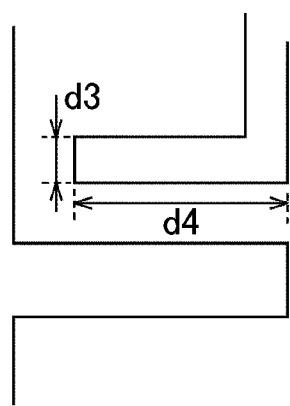
FIG. 9 is a schematic plan view (enlarged view) showing the second example of TFT in which the size of channel width is adjusted.

FIG. 8 and FIG. 9 are schematic plan views showing a second example of TFT in which the size of channel width is adjusted. The channel width d2 of the TFT 14 in FIG. 8 is formed not only between the drain electrode 23 and the source electrode 22 but also between the drain electrode 23 and a part of the source bus line 12. In this case, as shown in FIG. 9, the channel width d2 of the TFT 14 becomes the length of the sum of the length d3 of the portion facing the source bus line 12 and the length d4 of the portion facing the source electrode 22. The value of $\alpha$ can be adjusted among the picture elements by changing the size of d2 for each of the picture elements.

Figure 10:
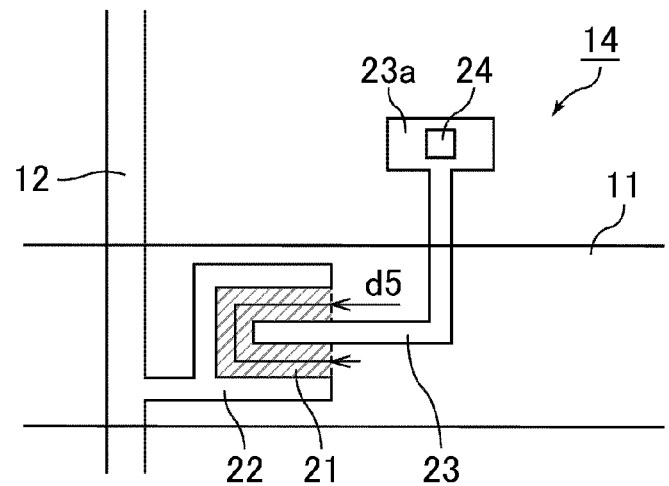
FIG. 10 is a schematic plan view showing a third example of TFT in which the size of channel width is adjusted.
Figure 11:
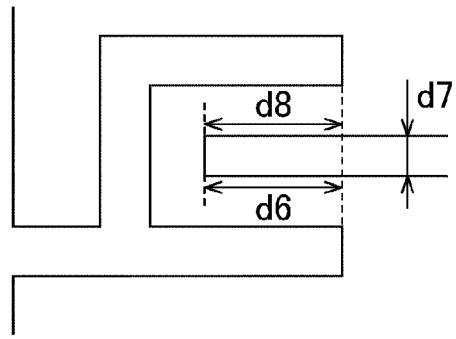
FIG. 11 is a schematic plan view (enlarged view) showing the third example of TFT in which the size of channel width is adjusted.

FIG. 10 and FIG. 11 are schematic plan views showing a third example of TFT in which the size of channel width is adjusted. In the TFT 14 shown in FIG. 10, the source electrode 22 extended from a part of the source bus line 12 is branched in the middle so as to have a shape surrounding the distal end of the drain electrode 23. In this case, as shown in FIG. 11, the channel width d5 of the TFT 14 becomes the length of the sum of the lengths d6 and d8 of the portions in parallel with the gate bus line 11, and the length d7 of the portion in parallel with the source bus line 12. The value of $\alpha$ can be adjusted among the picture elements by changing the size of d5 for each of the picture elements.

In Example 1, it is preferred that the values of $\alpha$ of the picture elements are close to each other. Specifically, it is preferred that the ratio expressed as: "(maximum value of $\alpha$−minimum value of $\alpha$)/(minimum of value of $\alpha$)" of the values of $\alpha$ of the picture elements is 10% or less. When the values of $\alpha$ of the picture elements are set close to each other, the variation in $\Delta Vd$ which is the through-feed voltage is suppressed, and thereby the optimum counter voltages among the picture elements are made close to each other. Thereby, the possibility of occurrence of image sticking can be greatly reduced. The value of $\alpha$ is obtained by the expression: $\alpha = Cgd/Cpix$ (Cpix=Cgd+Csd+Ccs+Clc). For this reason, the parameters included in the expression need to be adjusted, in order to adjust the balance between the values of $\alpha$ of the picture elements. The balance between the values of $\alpha$ of the picture elements can be effectively adjusted by adjusting the channel width.

Example 2

Figure 12:
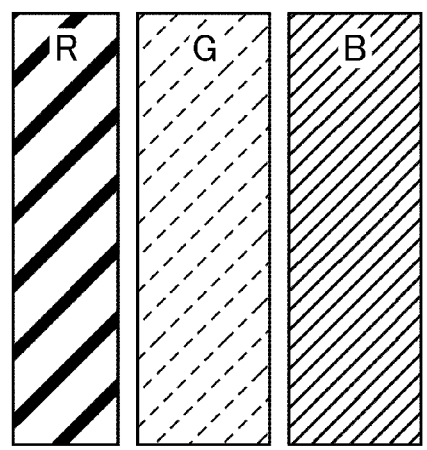
FIG. 12 is a schematic plan view of color filters for each pixel of Example 2.

FIG. 12 is a schematic plan view of color filters for a pixel of Example 2. As shown in FIG. 12, the color filters in Example 2 are arranged in a stripe shape, and picture elements of the same color are arranged in the longitudinal direction of the panel. Further, three color filters of red (R), green (G) and blue (B) are used in Example 2. The arrangement order of the colors is not limited in particular. In Example 2, the pitch width of the red (R) picture element is smaller than the pitch widths of the green (G) picture element and of the blue (B) picture element. The pitch width of the green (G) picture element is the same as the pitch width of the blue (B) picture element.

In the case where all the picture elements of red, green and blue are not formed to have the same pitch width, and the ratio of the red picture element is reduced, higher transmissivity is obtained as compared with the case where the ratios of these picture elements are the same. Note that, when the area of the pixel electrode is different among the picture elements, the color balance may be deteriorated, but the color balance can be adjusted by controlling the backlight. Specifically, the color balance can be adjusted, such as by controlling the backlight signal, and by changing the phosphor ratio of the light source used for the backlight.

Example 3

Figure 13:
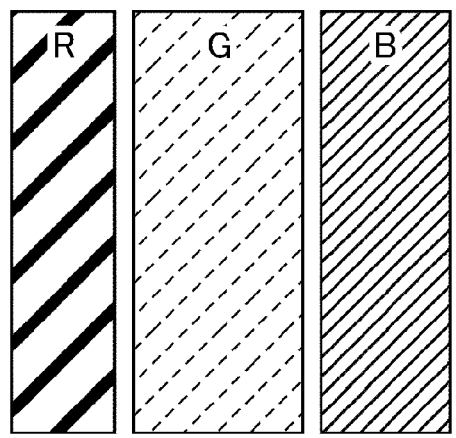
FIG. 13 is a schematic plan view of color filters for each pixel of Example 3.

FIG. 13 is a schematic plan view of color filters for a pixel of Example 3. As shown in FIG. 13, the color filters in Example 3 are arranged in a stripe shape, and picture elements of the same color are arranged in the longitudinal direction of the panel. Further, three color filters of red (R), green (G) and blue (B) are used in Example 3. The arrangement order of the colors is not limited in particular. In Example 3, the pitch width of the red (R) picture element is smaller than the pitch width of the blue (B) picture element, and the pitch width of the blue (B) picture element is smaller than the pitch width of the green (G) picture element.

In the case where all the picture elements of red, green and blue are not formed to have the same pitch width, and the ratio of the red picture element is reduced, and also the ratio of the green picture element is increased, higher transmissivity is obtained as compared with the case where the ratios of these picture elements are the same. Note that, when the area of the pixel electrode is different among the picture elements, the color balance may be deteriorated, but the color balance can be adjusted by controlling the backlight. Specifically, the color balance can be adjusted, such as by controlling the backlight signal, and by changing the phosphor ratio of the light source used for the backlight.

Example 4

Figure 14:
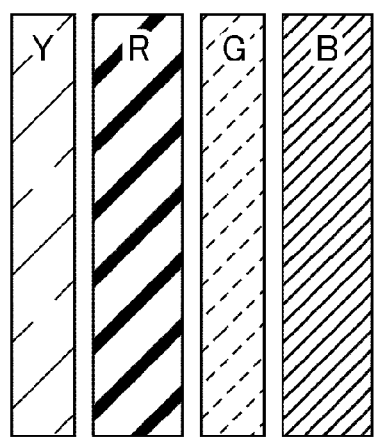
FIG. 14 is a schematic plan view of color filters for each pixel of Example 4.

FIG. 14 is a schematic plan view of color filters for a pixel of Example 4. As shown in FIG. 14, the color filters in Example 4 are arranged in a stripe shape, and picture elements of the same color are arranged in the longitudinal direction of the panel. Further, four color filters of red (R), green (G), blue (B) and yellow (Y) are used in Example 4. The arrangement order of the colors is not limited in particular. In Example 4, the pitch width of the green (G) picture element is the same as the pitch width of the yellow (Y) picture element, and the pitch width of the red (R) picture element is the same as the pitch width of the blue (B) picture element. The pitch width of the green (G) and yellow (Y) picture elements is smaller than the pitch width of the red (R) and blue (B) picture elements.

In the case where all the picture elements of red, green, blue and yellow are not formed to have the same pitch width, and the ratios of the red and blue picture elements are set higher, and also the ratios of the green picture element and the yellow picture element are set lower, wider color reproducibility is obtained as compared with the case where the ratios of these picture elements are the same. Note that, when the area of the pixel electrode is different among the picture elements, the color balance may be deteriorated, but the color balance can be adjusted by controlling the backlight. Specifically, the color balance can be adjusted by controlling the backlight signal, by changing the phosphor ratio of the light source used for the backlight, or the like.

Example 5

Figure 15:
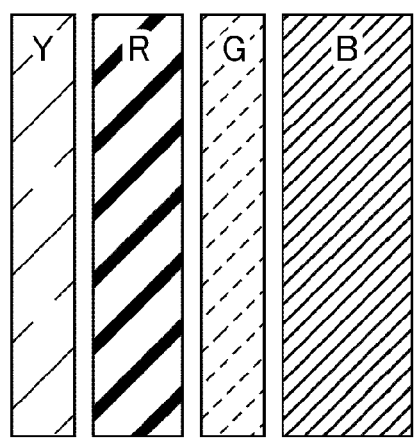
FIG. 15 is a schematic plan view of color filters for each pixel of Example 5.
Figure 16:
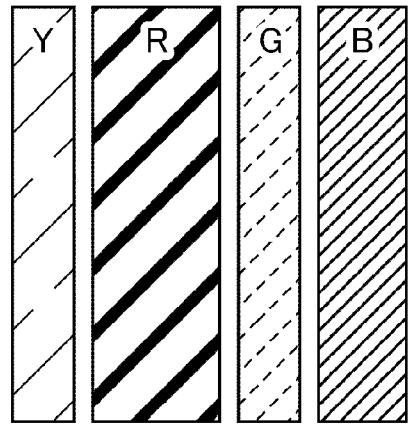
FIG. 16 is a schematic plan view of color filters for each pixel of Example 5.

Each of FIG. 15 and FIG. 16 is a schematic plan view of color filters for a pixel of Example 5. As shown in FIG. 15, the color filters in Example 5 are arranged in a stripe shape, and picture elements of the same color are arranged in the longitudinal direction of the panel. Further, four color filters of red (R), green (G), blue (B) and yellow (Y) are used in Example 5. The arrangement order of the colors is not limited in particular. In Example 5, the pitch width of the green (G) picture element is the same as the pitch width of the yellow (Y) picture element. The pitch width of the red (R) picture element is larger than any of the pitch width of the green (G) picture element and the pitch width of the yellow (Y) picture element. Further, the pitch width of the blue (B) picture element is larger than any of the pitch width of the green (G) picture element and the pitch width of the yellow (Y) picture element.

In the case where all the picture elements of red, green, blue and yellow are not formed to have the same pitch width, and the ratios of the red and blue picture elements are set higher, and also the ratios of the green and yellow picture elements are set lower, wider color reproducibility is obtained as compared with the case where the ratios of these picture elements are the same. Note that, when the area of the pixel electrode is different among the picture elements, the color balance may be deteriorated, but the color balance can be adjusted by controlling the backlight. Specifically, the color balance can be adjusted, such as by controlling the backlight signal, and by changing the phosphor ratio of the light source used for the backlight.

In the relationship between the pitch widths of the red and blue picture elements, a form is assumed in which one of the pitch widths of the red and blue picture elements is larger than the other. When the pitch width of the blue picture element is larger than the pitch width of the red picture element, the color filters are configured as shown in FIG. 15, while when the pitch width of the red picture element is larger than the pitch width of the blue picture element, the color filters are configured as shown in FIG. 16.

In these cases, it is preferred that the pitch widths of the red and blue picture elements are suitably set according to the arrangement places of the spacers for holding the cell gap, the formation place of the Cs line in the display region, and the like. Specifically, when a multilayer spacer formed by laminating color filters of a plurality of colors is used as the spacer, the multilayer spacer may be formed in the red picture element in order to obtain a sufficient height of the spacer. In this case, it is preferred that the ratio of the red picture element is made smaller than the ratio of the blue picture element. Further, for example, when copper (Cu) is used for the metal line such as the gate bus line and the source bus line, the light reflected by the copper (Cu) layer may become reddish, and hence the multilayer spacer may be formed in the blue picture element. In this case, it is preferred that the ratio of the blue picture element is made smaller than the ratio of the red picture element.

Example 6

Figure 17:
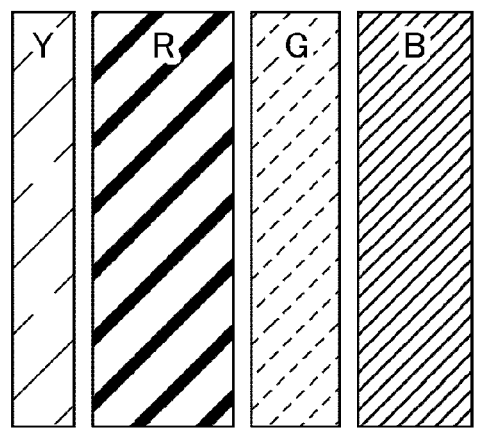
FIG. 17 is a schematic plan view of color filters for each pixel of Example 6.
Figure 18:
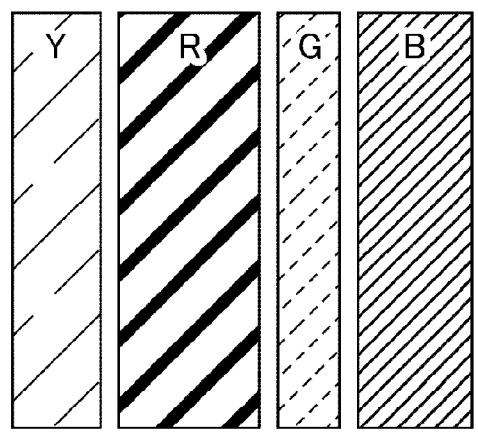
FIG. 18 is a schematic plan view of color filters for each pixel of Example 6.
Figure 19:
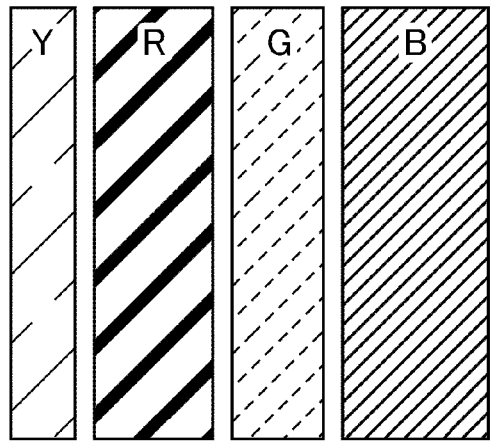
FIG. 19 is a schematic plan view of color filters for each pixel of Example 6.
Figure 20:
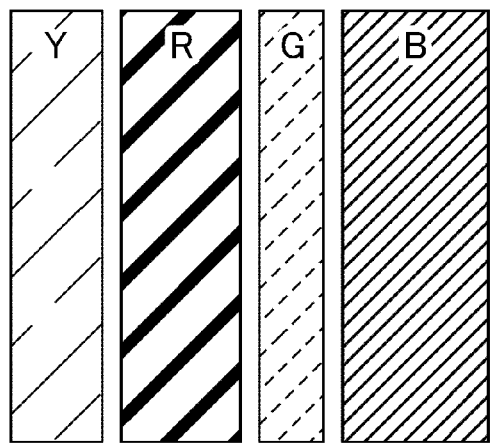
FIG. 20 is a schematic plan view of color filters for each pixel of Example 6.

Each of FIG. 17 to FIG. 20 is a schematic plan view of color filters for a pixel of Example 6. As shown in FIG. 17 to FIG. 20, the color filters in Example 6 are arranged in a stripe shape, and picture elements of the same color are arranged in the longitudinal direction of the panel. Further, four color filters of red (R), green (G), blue (B) and yellow (Y) are used in Example 6. The arrangement order of the colors is not limited in particular. In Example 6, the pitch width of the red (R) picture element is larger than any of the pitch width of the green (G) picture element and the pitch width of the yellow (Y) picture element. Also, the pitch width of the blue (B) picture element is larger than any of the pitch width of the green (G) picture element and the pitch width of the yellow (Y) picture element. In the relationship between the pitch widths of the green picture element and the yellow picture element, an embodiment is assumed in which one of the pitch widths of the green picture element and the yellow picture element is larger than the other. Also, in the relationship between the pitch widths of the red and blue picture elements, an embodiment is assumed in which one of the pitch widths of the red and blue picture elements is larger than the other. FIG. 17 shows an embodiment in which the pitch widths of the picture elements are set as yellow<green<blue<red, and FIG. 18 shows an embodiment in which the pitch widths of the picture elements are set as green<yellow<blue<red. FIG. 19 shows an embodiment in which the pitch widths of the picture elements are set as yellow<green<red<blue, and FIG. 20 shows an embodiment in which the pitch widths of the picture elements are set as green<yellow<red<blue.

In the case where all the picture elements of red, green, blue and yellow are not formed to have the same pitch width, and the ratios of the red and blue picture elements are set higher, and also the ratios of the green picture element and the yellow picture element are set lower, wider color reproducibility is obtained as compared with the case where the ratios of these picture elements are the same. Meanwhile, when the area of the pixel electrode is different among the picture elements, the color balance may be deteriorated, but the color balance can be adjusted by controlling the backlight. Specifically, the color balance can be adjusted, such as by controlling the backlight signal, and by changing the phosphor ratio of the light source used for the backlight.

In the relationships between the pitch widths of the red and blue picture elements and between the pitch widths of the green picture element and the yellow picture element, it is preferred that, similarly to Example 5, the pitch widths of the picture elements are suitably set according to the arrangement places of the spacers for holding the cell gap, the formation place of the Cs line in the display region, and the like. Specifically, the pitch widths of the picture elements are set as described above.

Example 7

Figure 21:
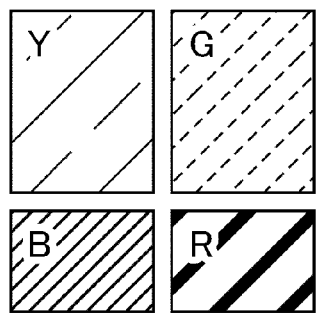
FIG. 21 is a schematic plan view of color filters for each pixel of Example 7.
Figure 22:
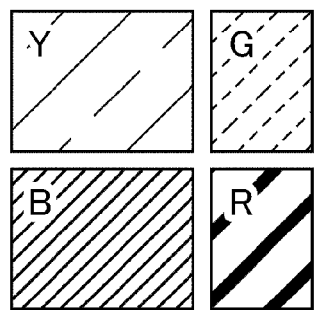
FIG. 22 is a schematic plan view of color filters for each pixel of Example 7.

Each of FIG. 21 and FIG. 22 is a schematic plan view of color filters for a pixel of Example 7. As shown in FIG. 21 and FIG. 22, the color filters in Example 7 are arranged in a two-by-two matrix shape corresponding to four picture elements of red, green, blue and yellow. One picture element is configured by a total of four squares arranged in a matrix shape in which two squares are formed in each of the longitudinal direction and the lateral direction. The arrangement order of the colors is not limited in particular. Any of the patterns of the areas of the picture elements in Examples 4 to 6 can be applied to the areas of the respective picture elements in Example 7. That is, Example 7 is the same as Examples 4 to 6 except that the stripe arrangement of the color filters is changed to the two-by-two matrix arrangement. Note that, in the case of the two-by-two matrix arrangement, a pixel is configured not only by picture elements arranged in the lateral direction but also by picture elements arranged in the longitudinal direction, unlike the case of the stripe arrangement. Therefore, the case where the pitch widths are different in the longitudinal direction as shown in FIG. 21 is assumed, and also the case where the pitch widths are different in the lateral direction as shown in FIG. 22 is assumed.

In the case where all the picture elements of red, green, blue, and yellow are not formed to have the same pitch width, and the ratio of the red picture element is set lower, higher transmissivity is obtained as compared with the case where the ratios of these picture elements are the same. Meanwhile, when the area of the pixel electrode is different among the picture elements, the color balance may be deteriorated, but the color balance can be adjusted by controlling the backlight. Specifically, the color balance can be adjusted by controlling the backlight signal, by changing the phosphor ratio of the light source used for the backlight, and the like.

Figure 23:
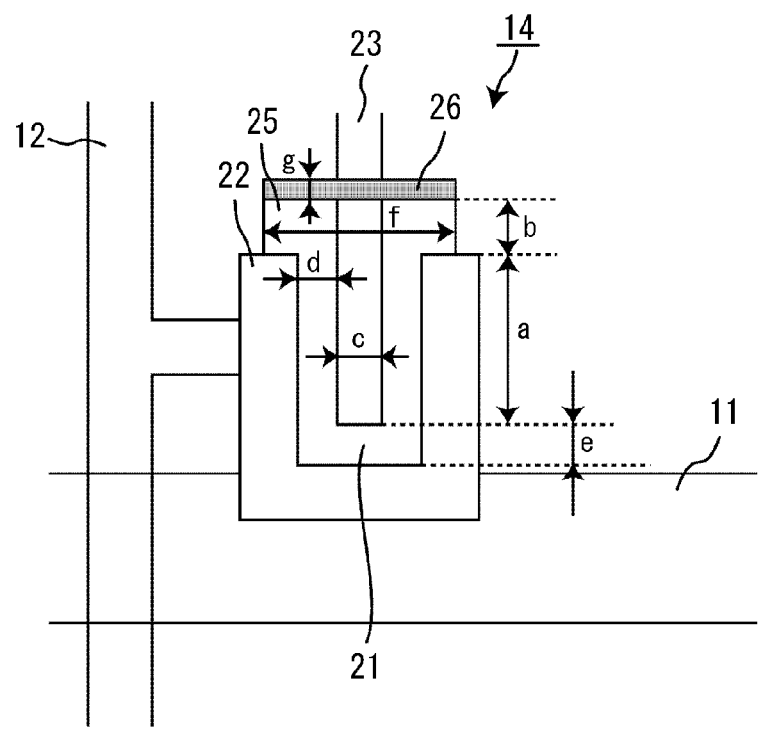
FIG. 23 is a schematic plan view showing an example of TFT in which the size of the overlapping area of the pixel electrode is actually adjusted in Example 5.

An example follows in which the overlapping area of the pixel electrode overlapped with the gate electrode is controlled so that Cgd gradation is set, and also the values of a among the picture elements are adjusted in a liquid crystal display device of Example 5. FIG. 23 is a schematic plan view showing an example of TFT in which the size of the overlapping area of the pixel electrode is adjusted in Example 5.

As shown in FIG. 23, the TFT 14 includes the source electrode 22 extended from a part of the source bus line 12, a gate electrode 25 extended from a part of the gate bus line 11, and the drain electrode 23 connected to the pixel electrode. The TFT 14 includes a semiconductor layer at a position at which the TFT 14 overlaps the gate electrode 25. A part of the semiconductor layer overlaps a part of each of the source electrodes 22 and the drain electrodes 23. Further, the other part of the semiconductor layer overlaps neither the source electrode 22 nor the drain electrode 23. In the other part of the semiconductor layer, a part sandwiched between the source electrode 22 and the drain electrode 23 in a plan view is the channel region 21. Here, the width of the channel region 21 of the semiconductor layer is set to be different for each of the picture elements, but the interval between the source electrode 22 and the drain electrode 23 is set to be the same for each of the picture elements.

In the example shown in FIG. 23, the drain electrode 23 has a linear shape extended in the direction in parallel with the source bus line 12. Further, the source electrode 22 has, in a plan view, an opening opened toward the side opposite to the side of the gate bus line 11, and has a shape configured to surround the distal end of the drain electrode 23.

The width of the drain electrode 23 is denoted by reference character c, and the interval between the drain electrode 23 and the source electrode 22 in the direction in parallel with the gate bus line 11 is denoted by reference character d. The distance between the drain electrode 23 and the source electrode 22 in the direction in parallel with the gate bus line 12 is denoted by reference character e. The length of the portion of the source electrode 22, which portion faces the drain electrode 23 and which portion is in parallel with the source bus line 12, is denoted by reference character a. The length obtained by subtracting the length of the portion of the source electrode 22 which portion is in parallel with the source bus line 12 from the length of the portion of the gate electrode 25, which portion is in parallel with the source bus line 12, is denoted by reference character b.

Table 1 shows data of the picture elements before setting Cgd gradation (the values are set so that the ΔVd differences are reduced among the picture elements before setting the gradation).

In the liquid crystal display device of Example 5, in the case where, in four color picture elements having different picture element pitches, the pitch widths of the picture elements were set as "blue">"red">"green=yellow," the deviation of the values of α (max-min) of the picture elements could be suppressed to 3.88% by adjusting the values of a to e among the picture elements as shown in Table 1 described below. Further, ΔVd in the red picture element was 1.838 V, ΔVd in the green picture element and the yellow picture element was 1.901 V, and ΔVd in the blue picture element was 1.910 V. The difference between the maximum and minimum values of ΔVd was 72 mV. In Example 8 and Example 9 below, the value of α is adjusted among the picture elements, and additionally the Cgd gradation is set. In the case of not setting the gradation, in-plane counter voltage distribution occurs, and thus flicker or degradation of image may occur in displayed images. The ratio of the pitch width of the red, green, yellow, and blue picture elements was set as "red": "green":"yellow":"blue"=1.4:1:1:1.7.

TABLE 1

|  | Picture element R | Picture elements G and Y | Picture element B |
|---|---|---|---|
| a (μm) | 28.0 | 19.0 | 40.5 |
| b (μm) | 6.0 | 6.0 | 6.0 |
| c (μm) | 5.0 | 5.0 | 5.0 |
| d (μm) | 4.5 | 4.5 | 4.5 |
| e (μm) | 4.5 | 4.5 | 4.5 |
| ΔVd (V) | 1.838 | 1.901 | 1.910 |

Example 8

The following Table 2 shows information of the picture elements in the case of setting gradation so that the same ΔCgd/Cpix was applied to the picture elements in a liquid crystal display device including the picture elements shown in Table 1. For setting the Cdg gradation, an overlapping area of the gate electrode and the drain electrode was changed by changing the length of the gate electrode along a signal travelling direction of the scanning line. The length of the gate electrode 26 to be changed is denoted by reference character g. The length in the direction parallel to the gate bus line 11 of the gate electrode 25 extended from a part of the gate bus line 11 is denoted by reference character f. The amount of 1 Step correction (Cgd correction amount) refers to an amount of increase or decrease in the g per 1 Step. Total number of Steps refers to the number of times of Step performed to increase the g in the correction. The maximum correction amount refers to the maximum value of the g. A ΔVd correction amount (mV) per 1 Step refers to an amount of increase or decrease in the ΔVd caused accompanying the increase or decrease in the g per 1 Step. The maximum correction amount (mV) refers to a ΔVd correction amount when the g is the maximum value, and is the maximum value of the ΔVd correction amount. An optimum counter voltage deviation (mV) is a difference between the maximum value and minimum value of in-plane counter voltage distribution before setting gradation. A ΔVd (V) at a position where the maximum correction amount is applied refers to the value of ΔVd when the g is the maximum value (position in a panel plane where g is the maximum value).

Figure 24:
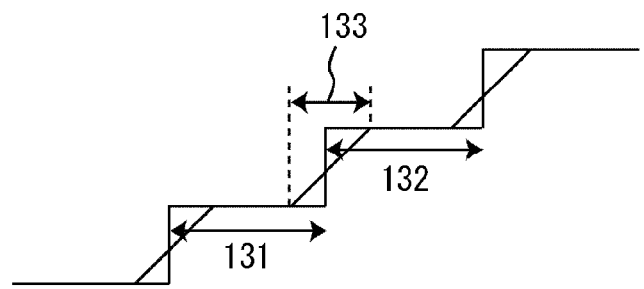
FIG. 24 is a graph showing a mosaic region between Step (n) and Step (n+1) in a liquid crystal display device of Embodiment 1.

FIG. 24 is a graph showing a mosaic region between Step (n) and Step (n+1) in the liquid crystal display device of Embodiment 1. A mosaic region 133 is a region where a pixel 131 of Step (n) and a pixel 132 of Step (n+1) are mixed. The mosaic region 133 may be provided or not provided in a liquid crystal display. The number of the pixels in the scanning line direction of the mosaic region 133 is any as long as a visually uneven portion is prevented from occurring so that smooth displays are achieved. The number is normally constant (for example, 24). The number of pixels (number of pixels to be maintained) in a portion not including the above described mixture may be, for example, four or more. Similarly, a mosaic region is provided in Example 9 and Comparative Example 1. Correction by Cgd gradation is basically determined by the correction amount per 1 Step and the number of pixels in a portion not including the mixture as described above. A smaller number of pixels to be maintained leads to steep correction, and thus a larger correction amount can be achieved. In contrast, a larger number of pixels to be maintained leads to mild correction, and thus a smaller correction amount can be achieved.

TABLE 2

|   |   | Picture element R | Picture elements G and Y | Picture element B |
|---|---|---|---|---|
| f (μm) | | 20.0 | 20.0 | 20.0 |
| g | Correction amount per 1 Step (μm) | 0.5 | 0.25 | 0.75 |
|   | Total number of Steps (unit: times) | 11 | 16 | 10 |
|   | Maximum correction amount (μm) | 5.5 | 4 | 7.5 |
|   | ΔVd correction amount per 1 Step (mV) | 14.0 | 9.9 | 16.4 |
|   | Maximum correction amount (mV) | 154.1 | 157.8 | 163.5 |
|   | OptiMum counter voltage deviation (mV) | 324.0 | 324.0 | 324.0 |
|   | ΔVd (V) at a position where the maximum correction amount is applied | 1.668 | 1.735 | 1.750 |

Figure 25:
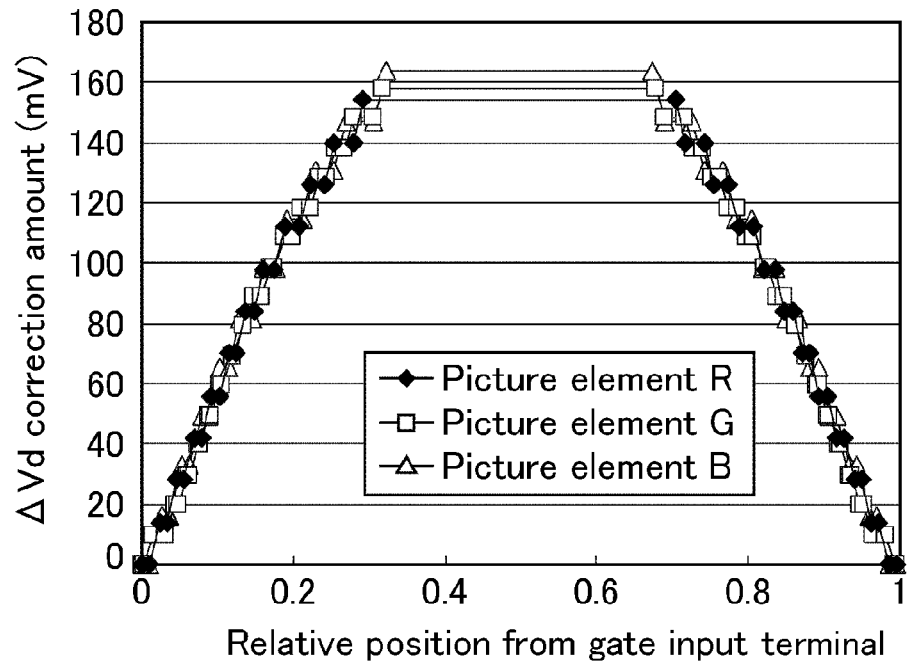
FIG. 25 is a graph showing the ΔVd correction amount (mV) at relative positions from a gate input terminal in a liquid crystal display device of Example 8.

FIG. 25 is a graph showing the ΔVd correction amount (mV) at relative positions from a gate input terminal in a liquid crystal display device of Example 8.

In the liquid crystal display device of Example 8, by controlling the value of g in each picture element according to the values shown in Table 2, difference in the ΔVd correction amount at the maximum correction amount was controlled to 154.1 mV in the red picture element, 157.8 mV in the green picture element and the yellow picture element, and 163.5 mV in the blue picture element. Thus, the difference between the maximum value and the minimum value of the difference in the ΔVd correction amount at the maximum correction amount among the picture elements was 9.4 mV. The optimum counter voltage deviation was 324 mV. At the maximum correction amount, the value of ΔVd was 1.668 V in the red picture element, 1.735 V in the green picture element and the yellow picture element, and 1.750 V in the blue picture element, and hence the difference between the maximum and minimum values of ΔVd was 82 mV at the maximum correction amount. The α deviation (ratio of a difference between the maximum and minimum values of α to the minimum value of α) was 4.19%. With the above-described design, the optimum counter voltage is sufficiently controlled in the picture elements. Hence, a liquid crystal display device capable of suppressing generation of image sticking was obtained.

Figure 26:
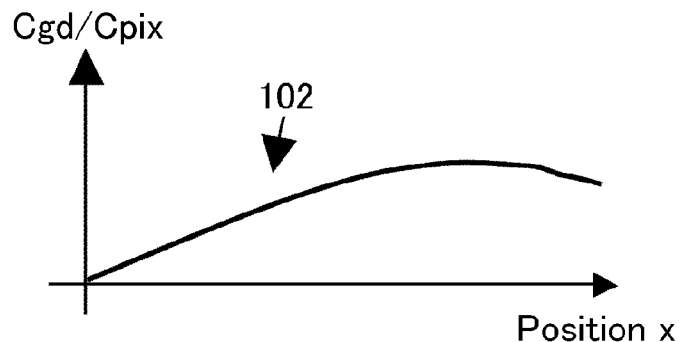
FIG. 26 is a graph showing a Cgd gradation performed in a liquid crystal display device of a modified version of Example 8.
Figure 27:
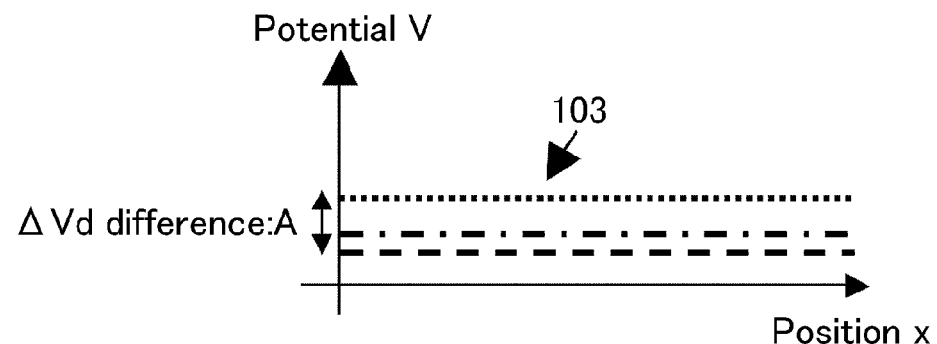
FIG. 27 is a graph showing in-plane counter voltage distributions of each of RGB three primary colors in the case of performing Cgd gradation in a liquid crystal display device of a modified version of Example 8.

Each of FIG. 26 and FIG. 27 shows a graph obtained in the case where gradation was set so that the same ΔCgd/Cpix was applied to each of the picture elements when there was a difference in ΔVd among the picture elements as shown in Example 8. In each of FIG. 26 and FIG. 27, a graph obtained in the case where three color picture elements were used, and a signal of the scanning line was input only from the position x=0 on the horizontal axis is shown.

FIG. 26 is a graph showing a Cgd gradation 102 provided in a liquid crystal display device of a modified version of Example 8. In FIG. 26, a solid line shows a Cgd correction amount (Cgd gradation) provided in R (red), G (green), and B (blue).

FIG. 27 is a graph showing in-plane counter voltage distributions of each of RGB three primary colors in the case of performing Cgd gradation in the liquid crystal display device of a modified version of Example 8. As shown in FIG. 27, in the case where the Cgd gradation was provided to the extent that the in-plane counter voltage distribution 103 was sufficiently reduced, the in-plane counter voltage distribution 103 in the picture elements each were almost constant. Accordingly, the ΔVd difference among the picture elements was approximately the same as that in the case of not providing Cgd gradation. In FIG. 27, a dashed-dotted line shows an in-plane counter voltage distribution 103 of G (green), a dotted line shows an in-plane counter voltage distribution 103 of B (blue), and a dashed line shows an in-plane counter voltage distribution 103 of R (red). In the modified version of Example 8, as shown in FIG. 27, in the case where the values of ΔVd were set to be uniform but were deviated by the amount A, the in-plane counter voltage distributions 103 appear as if they are parallel lines of translation in each pixel. In contrast, in the case where Cgd gradation is set so as to achieve the same Cgd/Cpix by considering the difference in the pixel capacitances, and also substantially the amount fully compensates the optimum counter voltage deviation, the in-plane counter voltage distribution 103 is constant with the ΔVd difference A.

Figure 28:
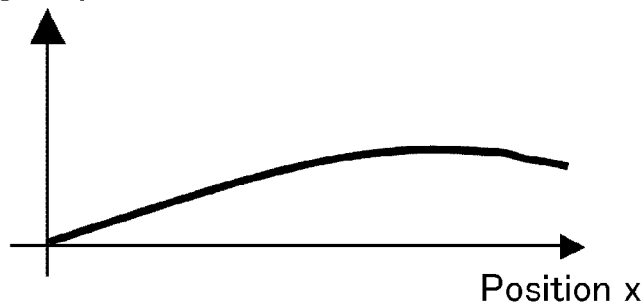
FIG. 28 is a graph showing a Cgd gradation performed in a liquid crystal display device of another modified version of Example 8.
Figure 29:
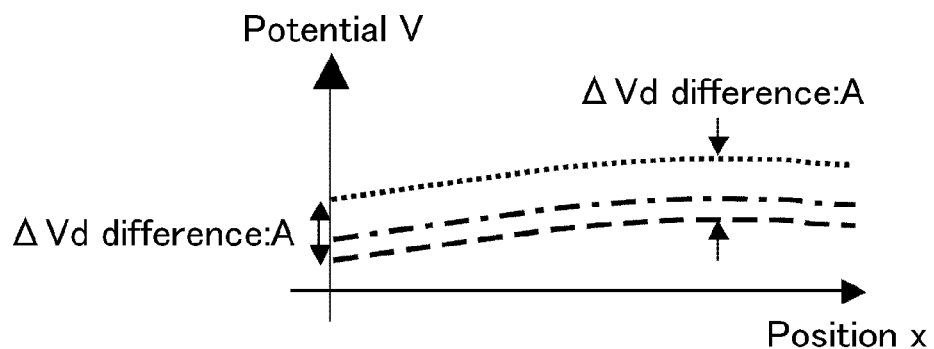
FIG. 29 is a graph showing in-plane counter voltage distributions of RGB three primary colors in the liquid crystal display device of the another modified version of Example 8 in the case of performing Cgd gradation.

Each of FIG. 28 and FIG. 29 shows a graph obtained in the case where gradation was set so that the same ΔCgd/Cpix was applied to the picture elements when there was a difference in ΔVd among the picture elements as shown in Example 8. In each of FIG. 28 and FIG. 29, a graph obtained in the case where three color picture elements were used, and a signal of the scanning line was input only from the position x=0 on the horizontal axis is shown.

FIG. 28 is a graph showing a Cgd gradation performed in a liquid crystal display device of another modified version of Example 8. In FIG. 28, a solid line shows a Cgd correction amount set for R (red), G (green), and B (blue).

FIG. 29 is a graph showing in-plane counter voltage distributions of RGB three primary colors in the case of performing Cgd gradation in the liquid crystal display device of the another modified version of Example 8. As shown in FIG. 29, in the case where the Cgd gradation was provided to the extent that the in-plane counter voltage distributions were sufficiently reduced, variation in the in-plane counter voltage distributions in the picture elements decreases but remains. Thus, the in-plane counter voltage distributions are not constant. The ΔVd difference among the picture elements was approximately the same as that in the case of not providing Cgd gradation. In FIG. 29, a dashed-dotted line shows an in-plane counter voltage distribution of G (green), a dotted line shows an in-plane counter voltage distribution of B (blue), and a dashed line shows an in-plane counter voltage distribution of R (red). In another modified Example 8, as shown in FIG. 29, in the case where the values of ΔVd were set to be uniform but were deviated by the amount A, the in-plane counter voltage distributions appear as if they are parallel lines of translation in each pixel. For example, the ΔVd difference A at the position x=0 and the ΔVd difference A at the position of the maximum correction amount are approximately the same. In terms of achieving a constant in-plane counter voltage distribution, the amount of Cgd gradation is preferably an amount that substantially compensates the optimum counter voltage deviation, as in the modified version of Example 8 described above.

Example 9

The following Table 3 shows information of the picture elements in the case where gradation was set such that a Cgd/Cpix leading to uniform in-plane counter voltages of the picture elements was achieved, in a liquid crystal display device including the picture elements shown in above Table 1. Even in the case where the gradation is set in the same manner as Example 8, the difference in the values of ΔVd is approximately several tens mV (82 mV in Example 8) in Example 9. Therefore, the Cgd gradation was set while considering the ΔVd difference. Meanwhile, the items in Table 3 are the same as those shown in above Table 2.

TABLE 3

|  |  | Picture element R | Picture elements G and Y | Picture element B |
|---|---|---|---|---|
| f(μm) |  | 20.0 | 20.0 | 20.0 |
| g | Correction amount per 1 Step (μm) | 0.5 | 0.25 | 0.75 |
|  | Total number of Steps (unit: times) | 11 | 16 | 9 |
|  | Maximum correction amount (μm) | 5.5 | 4 | 6.75 |
|  | ΔVd correction amount per 1 Step (mV) | 14.0 | 9.9 | 16.4 |
|  | Maximum correction amount (mV) | 154.1 | 157.8 | 147.2 |
|  | Optimum counter voltage deviation (mV) | 324.0 | 324.0 | 324.0 |
|  | ΔVd (V) at a position where the maximum correction amount is applied | 1.668 | 1.735 | 1.733 |

Figure 30:
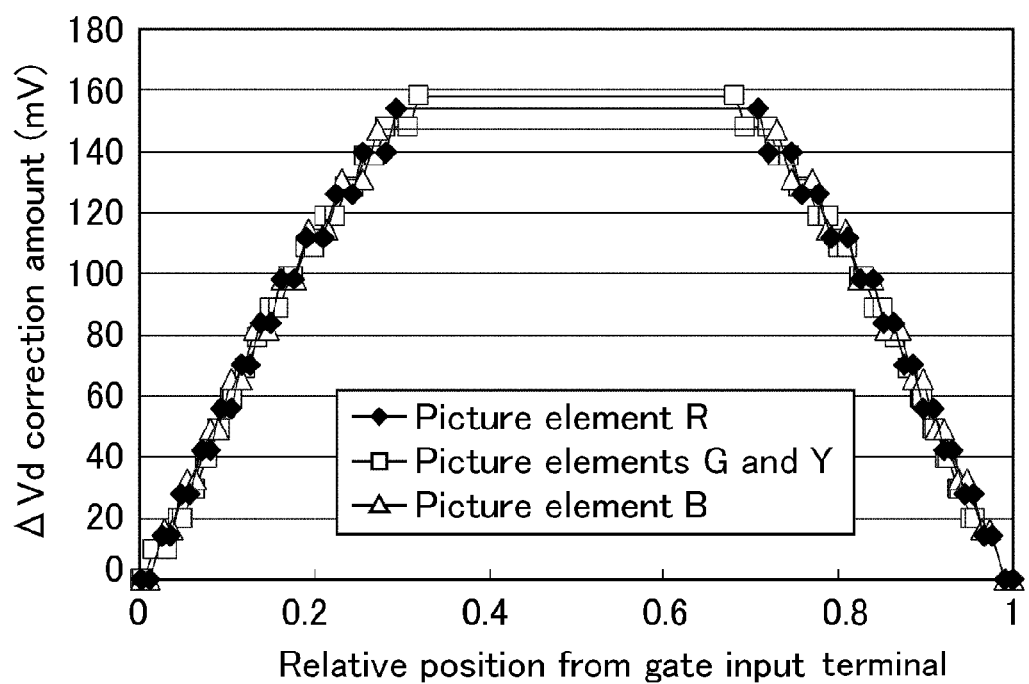
FIG. 30 is a graph showing the ΔVd correction amount (mV) at relative positions from a gate input terminal in a liquid crystal display device of Example 9.

FIG. 30 is a graph showing ΔVd correction amounts (mV) at relative positions from a gate input terminal in a liquid crystal display device of Example 9.

In the liquid crystal display device of Example 9, by controlling the value of g in each picture element according to the values shown in Table 3 and FIG. 30, difference in the ΔVd correction amount at the maximum correction amount was controlled to 154.1 mV in the red picture element, 157.8 mV in the green picture element and the yellow picture element, and 147.2 mV in the blue picture element. Thus, the difference between the maximum value and the minimum value of the difference in the ΔVd correction amount at the maximum correction amount among the picture elements was 23 mV. At the maximum correction amount, the value of ΔVd was 1.668 V in the red picture element, 1.735 V in the green picture element and the yellow picture element, and 1.733 V in the blue picture element. Hence, the difference between the maximum and minimum values of ΔVd was 67.0 mV at the maximum correction amount. The α deviation (ratio of a difference between the maximum and minimum values of α to the minimum value of α) was 3.40%. With the above-described design, by lowering the controlling level of the optimum counter voltage in the picture elements, the deviation of the value of α can be remedied. Thereby, a liquid crystal display device capable of suppressing generation of image sticking was obtained.

Figure 31:
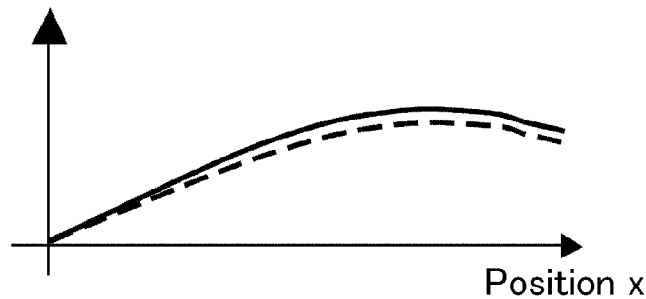
FIG. 31 is a graph showing a Cgd gradation performed in a liquid crystal display device of a modified version of Example 9.
Figure 32:
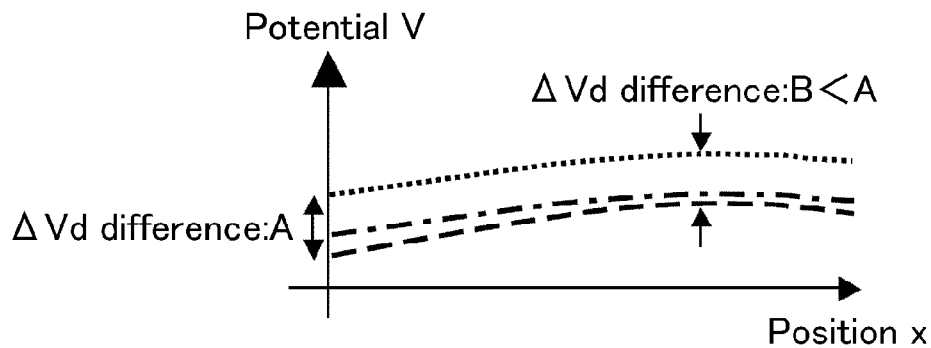
FIG. 32 is a graph showing in-plane counter voltage distributions of RGB three primary colors in the case of performing Cgd gradation in the liquid crystal display device of the modified version of Example 9.

Each of FIG. 31 and FIG. 32 shows a graph obtained in a modified version of Example 9 in which a gradation was set such that a Cgd/Cpix leading to uniform in-plane counter voltages of the picture elements was achieved when there is a difference in ΔVd among the picture elements as in Example 9. A graph using the picture elements of three colors (RGB) was shown in the modified version of Example 9.

FIG. 31 is a graph showing a Cgd gradation performed in a liquid crystal display device of a modified version of Example 9. In FIG. 31, a lower level of Cgd gradation is set for the pixel element (R) with a larger ΔVd. In FIG. 31, a solid line shows Cgd correction amount set for G (green) and B (blue), and a dashed line shows Cgd correction amount set for R (red).

FIG. 32 is a graph showing in-plane counter voltage distributions of RGB three primary colors in the case of performing Cgd gradation in the liquid crystal display device of the modified version of Example 9. In FIG. 32, a dashed-dotted line shows an in-plane counter voltage distribution of G (green), a dotted line shows an in-plane counter voltage distribution of B (blue), and a dashed line shows an in-plane counter voltage distribution of R (red).

As shown in FIG. 31 and FIG. 32, the Cgd gradation was set so that the values of α of the picture elements are made as close to each other as possible, while considering the ΔVd difference, at the time of the maximum correction amount in Example 9 and the modified version of Example 9.

When a lower level of Cgd gradation is set for the pixel element (R) with a larger ΔVd and a higher level of Cgd gradation is set for the pixel elements (G, B) with a smaller ΔVd as described above, the variation in the in-plane counter voltage distributions is reduced, and the ΔVd difference can be made smaller, though not the same, than that in Example 8. For example, although the ΔVd difference at the position x=0 remains to be A, the ΔVd difference B at the position corresponding to the maximum correction amount is smaller than A.

As described in Example 8 and Example 9, the overlapping area of the pixel electrode overlapped with the scanning line initially increases in a travelling direction of a scanning line signal but a rate of the increase subsequently decreases, in each of the pixel electrodes respectively arranged for the picture elements of single colors. The rates of increase are different among the pixel electrodes with different pixel capacitances. Moreover, as in the case of the liquid crystal display devices shown in Example 8 and Example 9, among the plurality of pixel electrodes arranged in one pixel, the rate of increase of a gate drain correction amount (rate of increase of the gate drain capacitance increased by changing an overlapping area of the pixel electrode with the scanning line) in a direction of the scanning signal in a pixel electrode with a larger gate drain capacitance (pixel electrode with a larger gate drain capacitance before correction) when an overlapping area of the pixel electrode with the scanning line is not changed is preferably the same or more than the rate of increase in a pixel electrode with a smaller gate drain capacitance (pixel electrode with a smaller gate drain capacitance before correction) when the overlapping area of the pixel electrode with the scanning line is not changed. With the above-described design, the variation in the in-plane counter voltage distributions can be more favorably suppressed, and the ΔVd difference can be made further smaller.

Example 8 is particularly preferable in terms of prevention of variation in the in-plane counter voltage distributions. Example 9 is particularly preferable in terms of achieving a smaller α deviation. Preferable gradation (Cgd correction) may be either one of that shown in Example 8 and that shown in Example 9.

Comparative Example 1

The following Table 4 shows information of the picture elements in the case where the gradation arrangement is not controlled in a liquid crystal display device including the picture elements shown in above Table 1. Meanwhile, the items in Table 4 are the same as those shown in above Tables 2 and 3.

TABLE 4

|  | | Picture element R | Picture elements G and Y | Picture element B |
|---|---|---|---|---|
| f(μm) | | 20.0 | 20.0 | 20.0 |
| g | Correction amount per 1 Step (μm) | 0.25 | 0.25 | 0.25 |
|  | Total number of Steps (unit: times) | 16 | 16 | 16 |
|  | Maximum correction amount (μm) | 4 | 4 | 4 |
|  | ΔVd correction amount per 1 Step (mV) | 7.0 | 9.9 | 5.5 |
|  | Maximum correction amount (mV) | 112.0 | 157.8 | 87.2 |
|  | Optimum counter volTage deviation (mV) | 324.0 | 324.0 | 324.0 |
|  | ΔVd (V) at a position where the maximum correction amount is applied | 1.626 | 1.735 | 1.673 |

Figure 33:
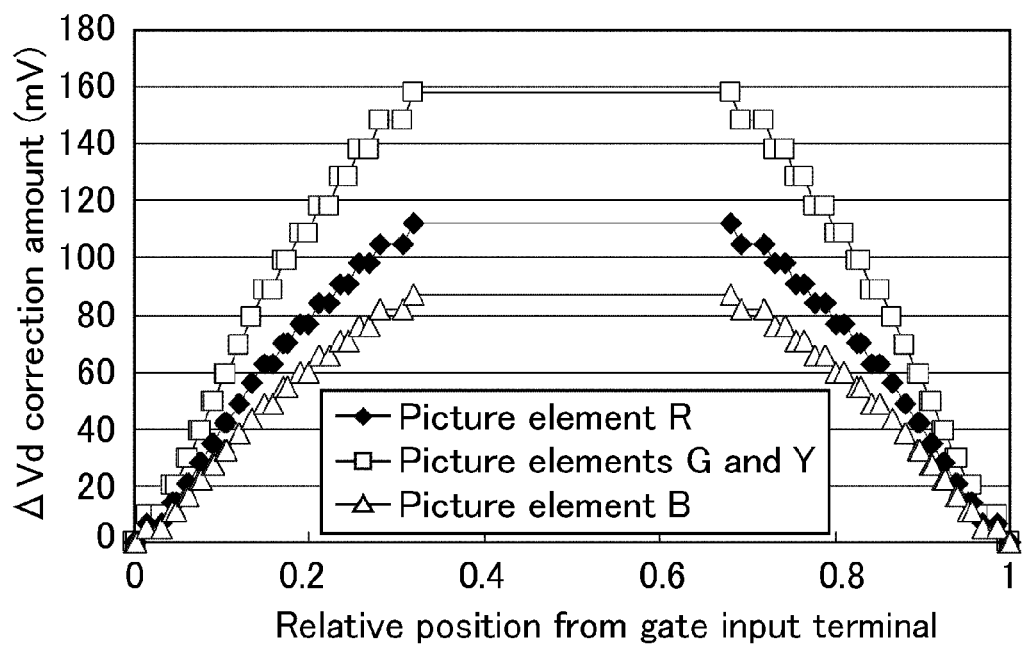
FIG. 33 is a graph showing the ΔVd correction amount (mV) at relative positions from a gate input terminal in a liquid crystal display device of Comparative Example 1.

FIG. 33 is a graph showing the ΔVd correction amount (mV) at relative positions from a gate input terminal in a liquid crystal display device of Comparative Example 1.

In the liquid crystal display device of Comparative Example 1, by controlling the value of gin each picture element according to the values shown in Table 4 and FIG. 33, difference in the ΔVd correction amount at the maximum correction amount was adjusted to 112.0 mV in the red picture element, 157.8 mV in the green picture element and the yellow picture element, and 87.2 mV in the blue picture element. Thus, the difference between the maximum value and the minimum value of the difference in the ΔVd correction amount at the maximum correction amount among the picture elements was 70.6 mV. At the maximum correction amount, the value of ΔVd was 1.626 V in the red picture element, 1.735 V in the green picture element and the yellow picture element, and 1.673 V in the blue picture element, and hence the difference between the maximum and minimum values of ΔVd was 109 mV at the maximum correction amount. The α deviation (ratio of a difference between the maximum and minimum values of α to the minimum value of α) was 6.53%. Therefore, image sticking may occur in a liquid crystal display device with the above-described design.

Figure 34:
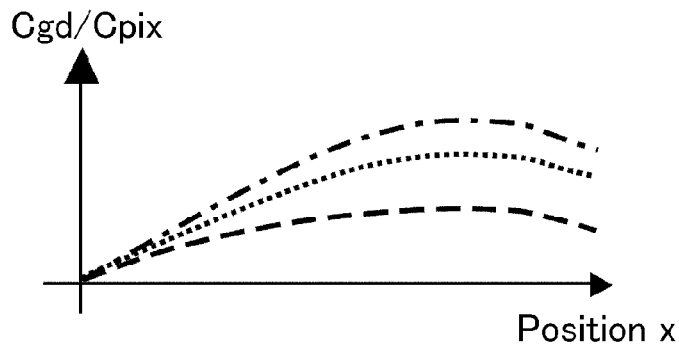
FIG. 34 is a graph showing a Cgd gradation performed in a liquid crystal display device of a modified version of Comparative Example 1.
Figure 35:
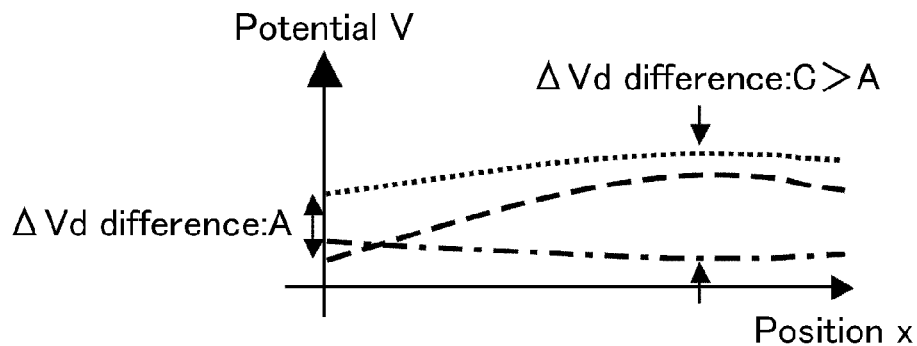
FIG. 35 is a graph showing in-plane counter voltage distributions of RGB three primary colors in the case of performing Cgd gradation in the liquid crystal display device of the modified version of Comparative Example 1.

Each of FIG. 34 and FIG. 35 shows a graph obtained in a modified version of Comparative Example 1 in which gradation was set under the same condition on the rate of increase of the overlapping area of the pixel electrode with the scanning line among the pixel elements, when there is a difference in ΔVd among the picture elements as shown in Comparative Example 1. Since the pixel capacitances of the pixel electrodes are different from one another, the gradation is different from one another. Meanwhile, the graphs shown in FIG. 34 and FIG. 35 are obtained when the picture elements of three colors (RGB) were used.

FIG. 34 is a graph showing a Cgd gradation performed in a liquid crystal display device of a modified version of Comparative Example 1. In FIG. 34, a dashed-dotted line shows Cgd correction amount set for G (green), a dotted line shows Cgd correction amount set for B (blue), and a dashed line shows Cgd correction amount set for R (red).

FIG. 35 is a graph showing in-plane counter voltage distributions of RGB three primary colors in the case of performing Cgd gradation in the liquid crystal display device of the modified version of Comparative Example 1. In FIG. 35, a dashed-dotted line shows an in-plane counter voltage distribution of G (green), a dotted line shows an in-plane counter voltage distribution of B (blue), and a dashed line shows an in-plane counter voltage distribution of R (red).

As shown in FIG. 34 and FIG. 35, in Comparative Example 1 and the modified version of Comparative Example 1, the Cgd gradation may be set too high (G) or too low (R) for an amount of compensation required in the case where the Cgd gradation is set in the same shape (same Cgd correction amount and the number of steps) without considering the difference in the pixel capacitances. Therefore, it is not possible to control both of the in-plane counter voltage distribution and the ΔVd within the ranges which allow sufficient exertion of the effects of the present invention. For example, the ΔVd difference C at the position corresponding to the maximum correction amount is larger than the ΔVd difference A at the position x=0.

The following Table 5 is a table showing permissible ranges of the deviation of the value of α when the difference of the values of ΔVd is assumed to be less than 100 mV in the liquid crystal display device of the present invention. It is seen that, when the difference between the values of ΔVd is 100 mV or less, the image sticking can be easily suppressed, and that, when the difference between the values of ΔVd is 50 mV or less, the image sticking can be more surely suppressed.

TABLE 5

| ΔVd (V) | Vgpp (V) | α | Deviation of α (%) |
|---|---|---|---|
| 1 | 41 | 0.02439 | 10.0 |
| 1.1 | 41 | 0.02683 | |
| 1.5 | 41 | 0.03659 | 6.7 |
| 1.6 | 41 | 0.03902 | |
| 2 | 41 | 0.04878 | 5.0 |
| 2.1 | 41 | 0.05122 | |
| 3 | 41 | 0.07317 | 3.3 |
| 3.1 | 41 | 0.07561 | |

As shown in Table 5 described above, the deviation of the value of α was 10.0% at the time when the value of ΔVd was set to 1.0V, and when the difference between the values of ΔVd was set to 100 mV. The deviation of the value of α was 6.7% at the time when the value of ΔVd was set to 1.5 V, and when the difference between the values of ΔVd was set to 100 mV. The deviation of the value of α was 5.0% at the time when the value of ΔVd was set to 2.0 V, and when the difference between the values of ΔVd was set to 100 mV. The deviation of the value of α was 3.3% at the time when the value of ΔVd was set to 3.0 V, and when the difference between the values of ΔVd was set to 100 mV.

It was found to be preferred that, in a normal liquid crystal display device, the value of ΔVd is set in the range of 1.5 to 3.0 V, and that, under this condition, the deviation of the value of α is set in the range of 7.0% or less. Further, it is conceivable that the value of ΔVd may be set as in the range of ΔVd=1 V in future, and it was found to be preferred that, in this case, the deviation of the value of α is set in the range of 10.0% or less.

Figure 36:
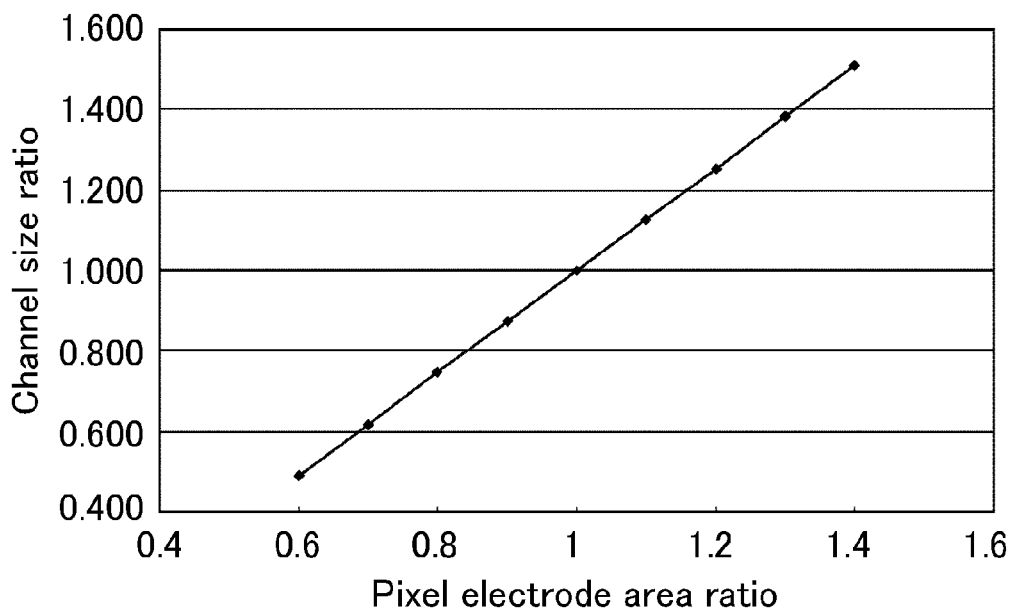
FIG. 36 is a graph showing a relationship between the channel size ratio and the pixel electrode area ratio.

A relationship between the channel size and the pixel electrode area in the liquid crystal display device of the present invention was investigated. As a result, data as shown in Table 6 and FIG. 36 were obtained. FIG. 36 is a graph showing a relationship between the channel size ratio and the pixel electrode area ratio.

TABLE 6

| Channel size ratio | Pixel electrode area ratio |
|---|---|
| 0.491 | 0.6 |
| 0.618 | 0.7 |
| 0.745 | 0.8 |
| 0.873 | 0.9 |
| 1.000 | 1 |
| 1.127 | 1.1 |

TABLE 6-continued

| Channel size ratio | Pixel electrode area ratio |
|---|---|
| 1.255 | 1.2 |
| 1.382 | 1.3 |
| 1.509 | 1.4 |

The variation in the values of α among the picture elements before performing Cgd gradation can be suppressed by changing the values of a to e of the TFT channel according to Table 6 and along the straight line shown in FIG. 36.

Figure 37:
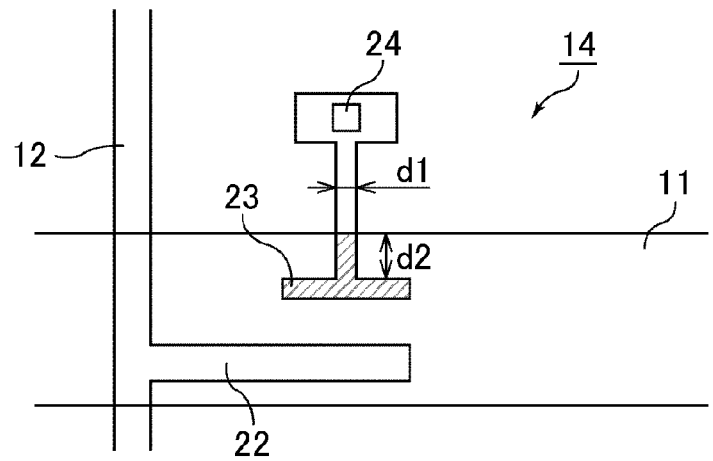
FIG. 37 is a schematic plan view showing a region in which the gate bus line and the drain electrode overlap each other.
Figure 38:
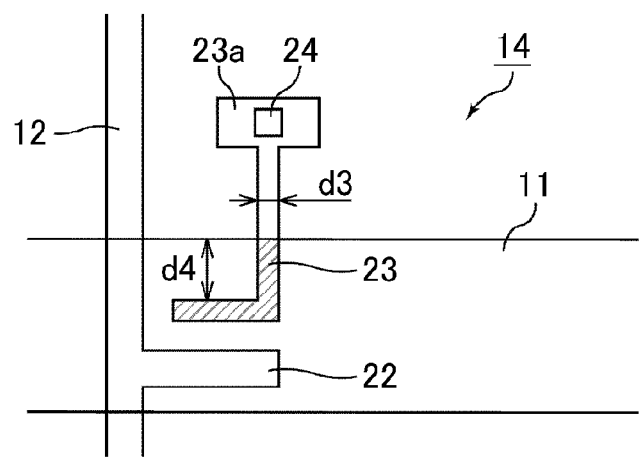
FIG. 38 is a schematic plan view showing a region in which the gate bus line and the drain electrode overlap each other.
Figure 39:
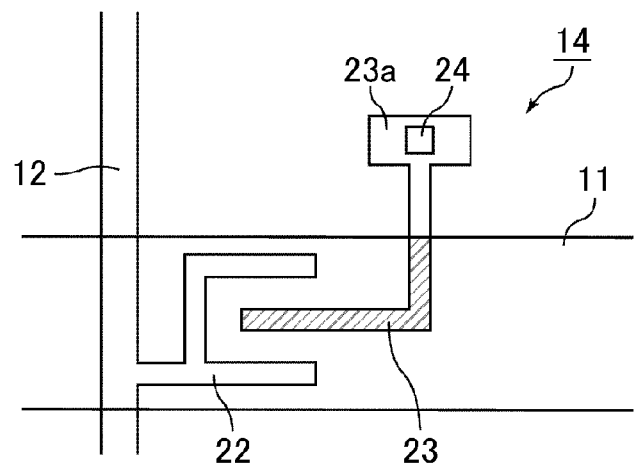
FIG. 39 is a schematic plan view showing a region in which the gate bus line and the drain electrode overlap each other.

Further, the difference in the lengths of the source electrode and the drain electrode between the TFTs shown in FIG. 7 to FIG. 9 actually also influences the overlapping area of the gate bus line and the drain electrode as shown in FIG. 37 to FIG. 39. Each of FIG. 37 to FIG. 39 is a schematic plan view showing a region in which the gate bus line and the drain electrode overlap each other in Embodiment 1. Since, as the overlapping area of the gate bus line 11 and the drain electrode 23 is increased, the value of the gate-drain capacitance (Cgd) is more changed, the balance among all the values of α of the picture elements can be adjusted also by adjusting the overlapping area of the gate bus line 11 and the drain electrode 23 in addition to the adjustment of the channel length.

As described above, in Embodiment 1, the balance between the values of α=Cgd/(Cgd+Csd+Ccs+Clc) of the picture elements is adjusted. As can be seen from the above-described expression, it is effective to adjust the Cgd in order to adjust the balance between the values of α of the picture elements.

Actually, the difference in the overlapping area of the drain electrode and the gate bus line in the TFT also influences the gate-drain capacitance (Cgd) formed between the gate bus line and the drain electrode. As the overlapping area of the gate bus line and the drain electrode increases, the value of the gate-drain capacitance (Cgd) increases. Thus, the balance between the values of α of the picture elements can be adjusted also by adjusting the overlapping area of the gate bus line and the drain electrode.

Figure 40:
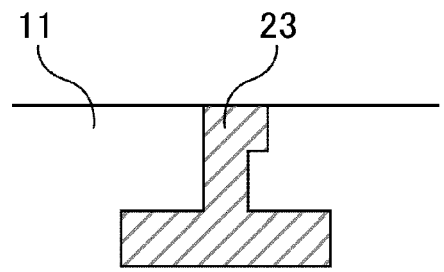
FIG. 40 shows an example of TFT in which the size of the overlapping area of the gate bus line and the drain electrode is adjusted in the example of TFT shown in FIG. 37, and shows a form in which the dimension d1 of the TFT shown in FIG. 37 is changed.
Figure 41:
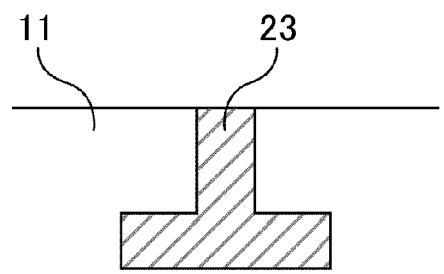
FIG. 41 shows an example of TFT in which the size of the overlapping area of the gate bus line and the drain electrode is adjusted in the example of TFT shown in FIG. 37, and shows a form in which the dimension d1 of the TFT shown in FIG. 37 is changed.
Figure 42:
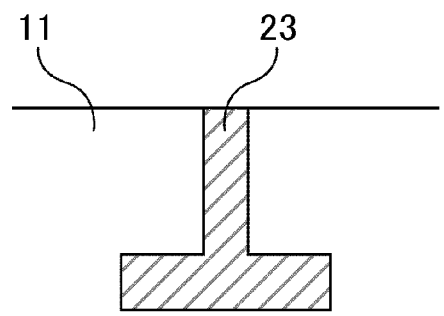
FIG. 42 shows an example of TFT in which the size of the overlapping area of the gate bus line and the drain electrode is adjusted in the example of TFT shown in FIG. 37, and shows a form in which the dimension d2 of the TFT shown in FIG. 37 is changed.
Figure 43:
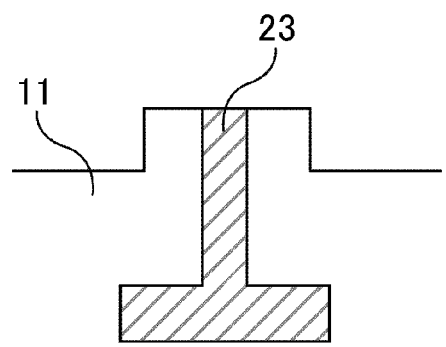
FIG. 43 shows an example of TFT in which the size of the overlapping area of the gate bus line and the drain electrode is adjusted in the example of TFT shown in FIG. 37, and shows a form in which the dimension d2 of the TFT shown in FIG. 37 is changed.

Each of FIG. 40 to FIG. 43 shows an example of TFT in which the size of the overlapping area of the gate bus line and the drain electrode is adjusted in the example of TFT shown in FIG. 37. Each of FIG. 40 and FIG. 41 shows a form in which the channel width d1 of the TFT shown in FIG. 37 is changed. In FIG. 40, a projecting section is provided in a planar shape in a part of the overlapping region of the drain electrode 23 and the gate bus line 11. In FIG. 41, the channel width d1 as a whole is increased. Each of FIG. 42 and FIG. 43 shows a form in which the dimension d2 of the TFT shown in FIG. 37 is changed. In FIG. 42, the length of d2 is increased. In FIG. 43, the shape of the drain electrode 23 is maintained as it is, but a projecting section is provided in a planar shape in a part of the gate bus line 11, so that the overlapping region of the drain electrode 23 and the gate bus line 11 is increased.

Figure 44:
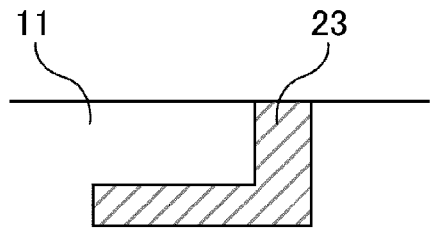
FIG. 44 shows an example of TFT in which the size of the overlapping area of the gate bus line and the drain electrode is adjusted in the example of TFT shown in FIG. 38, and shows a form in which the dimension d3 of the TFT shown in FIG. 38 is changed.
Figure 45:
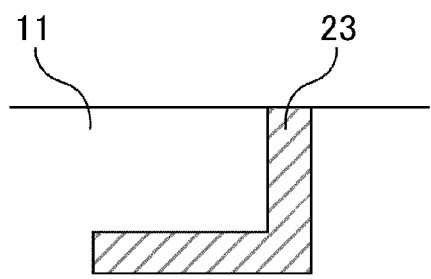
FIG. 45 shows an example of TFT in which the size of the overlapping area of the gate bus line and the drain electrode is adjusted in the example of TFT shown in FIG. 38, and shows a form in which the dimension d4 of the TFT shown in FIG. 38 is changed.
Figure 46:
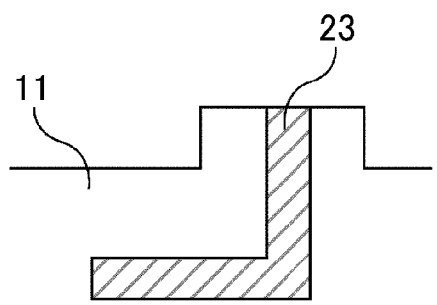
FIG. 46 shows an example of TFT in which the size of the overlapping area of the gate bus line and the drain electrode is adjusted in the example of TFT shown in FIG. 38, and shows a form in which the dimension d4 of the TFT shown in FIG. 38 is changed.

Each of FIG. 44 to FIG. 46 shows an example of TFT in which the size of the overlapping area of the gate bus line and the drain electrode is adjusted in the example of TFT shown in FIG. 38. FIG. 44 shows a form in which the dimension d3 of the TFT shown in FIG. 38 is changed. In FIG. 44, the width d3 as a whole is increased. Each of FIG. 45 and FIG. 46 shows a form in which the dimension d4 of the TFT shown in FIG. 38 is changed. In FIG. 45, the length of d4 is increased. In FIG. 46, the shape of the drain electrode 23 is maintained as it is, but a projecting section is provided in a planar shape in a part of the gate bus line 11, so that the overlapping region of the drain electrode 23 and the gate bus line 11 is increased.

The gate-drain capacitance (Cgd) formed between the gate bus line and the drain electrode is also formed in the region in which the gate bus line and the pixel electrode directly overlap each other. Since, as the overlapping area of the gate bus line and the pixel electrode is increased, the value of the gate-drain capacitance (Cgd) is increased, the balance between the values of α of the picture elements can be adjusted also by adjusting the overlapping area of the gate bus line and the pixel electrode.

Figure 47:
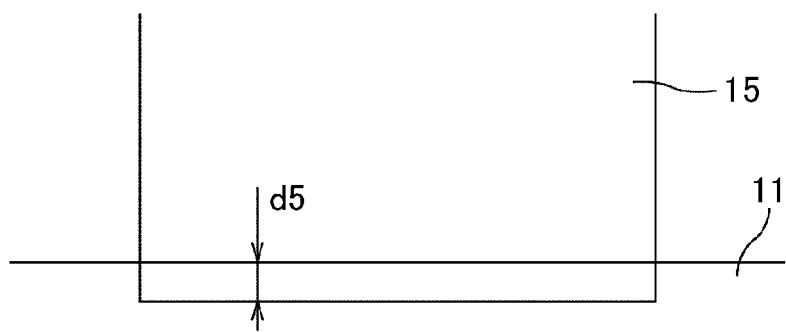
FIG. 47 is a schematic plan view showing a region in which the gate bus line and the pixel electrode overlap each other, and showing a form in which a normal gate bus line and a normal pixel electrode overlap each other.
Figure 48:
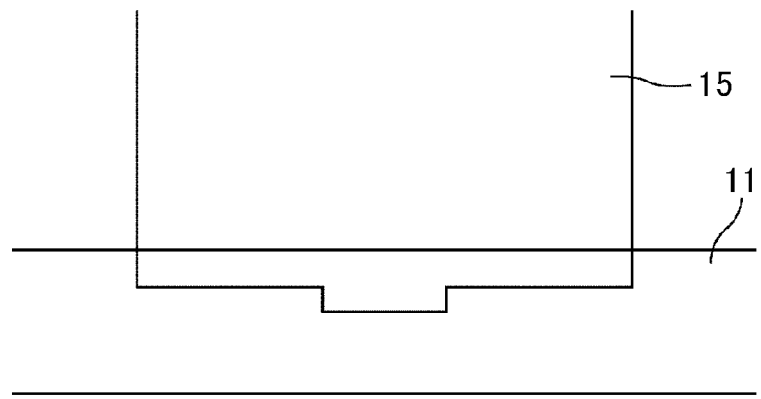
FIG. 48 is a schematic plan view showing a region in which the gate bus line and the pixel electrode overlap each other, and showing an example in which the size of the overlapping area of the gate bus line and the drain electrode is adjusted.
Figure 49:
FIG. 49 is a schematic plan view showing a region in which the gate bus line and the pixel electrode overlap each other, and showing an example in which the size of the overlapping area of the gate bus line and the drain electrode is adjusted.

Each of FIG. 47 to FIG. 49 is a schematic plan view showing a region in which the gate bus line and the pixel electrode overlap each other in Embodiment 1. FIG. 47 shows a form in which a normal gate bus line and a normal pixel electrode overlap each other, and in which the end portion of the pixel electrode 15 is linearly formed, and the gate bus line 11 is extended in parallel with the end portion of the pixel electrode 15. Each of FIG. 48 and FIG. 49 shows an example in which the size of the overlapping area of the gate bus line and the drain electrode is adjusted. In FIG. 48, a projecting section is provided in a planar shape in a part of the pixel electrode 15 in the overlapping region of the pixel electrode 15 and the gate bus line 11. Therefore, as a result, the overlapping region of the pixel electrode 15 and the gate bus line 11 is expanded. In FIG. 49, a recessed section (cut-out section) is provided in a planar shape in a part of the pixel electrode 15 in the overlapping region of the pixel electrode 15 and the gate bus line 11. Therefore, as a result, the overlapping region of the pixel electrode 15 and the gate bus line 11 is narrowed.

As described above, when the overlapping area of the drain electrode and the gate bus line and the overlapping area of the pixel electrode and the gate bus line are controlled so that, for example, an overlapping area of the pixel electrode with a larger area is larger than an overlapping area of the pixel electrode with a smaller area, among the plurality of the pixel electrodes arranged in one pixel, the gate drain capacitance formed by the pixel electrode with a larger pixel capacitance can be made larger than the gate drain capacitance formed by the pixel electrode with a smaller pixel capacitance. As a result, the variation in the values of α among the picture elements before performing Cgd gradation can be suppressed. Moreover, when the overlapping area is formed such that it initially increases in a travelling direction of the scanning line but a rate of the increase subsequently decreases, and the rates of the increase are different among the pixel electrodes with different areas, the Cdg correction amount in each of the pixel electrode can be appropriately set depending on the area size of the pixel electrode. Hence, the counter voltage can be made closer to the optimum value for each picture element, and thus a liquid crystal display device capable of suppressing generation of image sticking can be obtained.

The following shows an example in which an overlapping area of the gate bus line and the drain electrode was made different among the picture elements, as a means to allow the gate-drain capacitance formed by the pixel electrode with a larger pixel capacitance to be larger than the gate-drain capacitance formed by the pixel electrode with a smaller pixel capacitance. In the example, a relationship of the overlapping area of the gate bus line and the drain electrode, with the deviation between the values of α of three color picture elements having different picture element pitches, was actually investigated. The results are shown below. Note that, in the investigation described below, the adjustment based on the difference in the channel width is not included, and only the adjustment based on the gate-drain area is included.

In the case where the pitch widths of the three picture elements were set as "red">"green=blue", the deviation among the values of α of the three color picture elements could be reduced to 2.92% by adjusting the values of α to e among the respective picture elements as shown in Table 7 described below. Further, the value of ΔVd of the red picture element was 1.194 V, and the value of ΔVd of the green and blue picture elements was 1.230 V, and hence the difference between the maximum and minimum values of ΔVd was 36 mV. Therefore, with the above-described design, the variation in the values of α among the picture elements before performing Cgd gradation can be suppressed. Note that the ratio of the pitch width of the red, green and blue picture elements was set as "red":"green":"blue"=1:1:0.86.

TABLE 7

| | Picture element R (μm) | Picture elements G and B (μm) |
|---|---|---|
| a | 14.25 | 14.25 |
| b | 14.0 | 9.5 |
| c | 4.5 | 4.5 |
| d | 4.0 | 4.0 |
| e | 4.0 | 4.0 |

Figure 50:
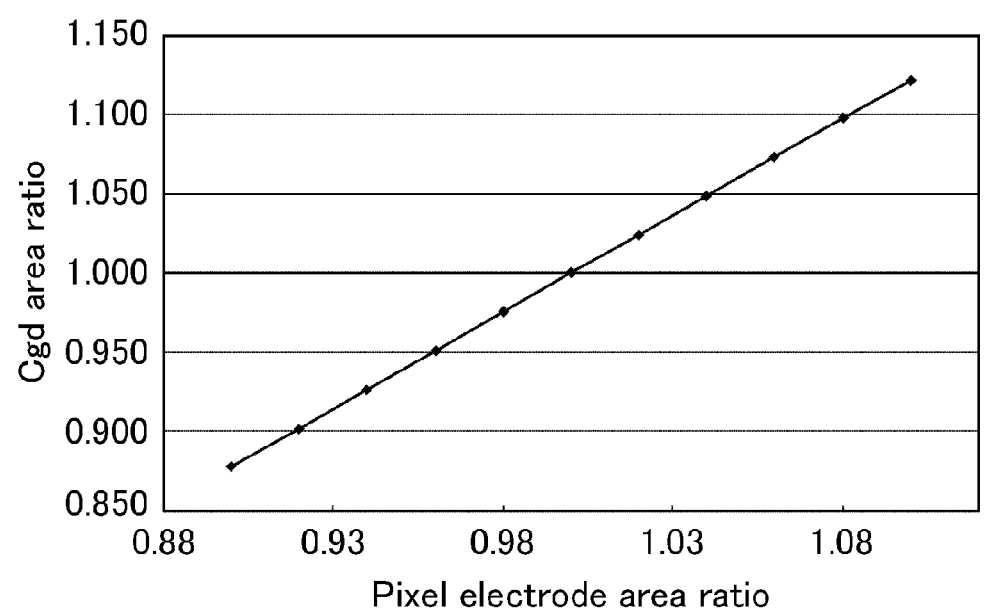
FIG. 50 is a graph showing a relationship between the gate-drain overlapping area ratio and the pixel electrode area ratio.

The relationship between the gate-drain overlapping area and the pixel electrode area before performing Cgd gradation was further investigated. Data as shown in Table 8 and FIG. 50 were obtained. FIG. 50 is a graph showing a relationship between the gate-drain overlapping area ratio and the pixel electrode area ratio.

TABLE 8

| Cgd area ratio | Pixel electrode area ratio |
|---|---|
| 0.878 | 0.9 |
| 0.902 | 0.92 |
| 0.927 | 0.94 |
| 0.951 | 0.96 |
| 0.976 | 0.98 |
| 1.000 | 1 |
| 1.024 | 1.02 |
| 1.049 | 1.04 |
| 1.073 | 1.06 |
| 1.098 | 1.08 |
| 1.122 | 1.1 |

The variation in the values of α among the picture elements before performing Cgd gradation depending on the ratio of the areas of the pixel electrodes is reduced by changing the values of a to e of the TFT channel according to Table 8 and along the straight line shown FIG. 50.

The variation in the values of α among the picture elements before performing Cgd gradation can be more appropriately reduced in such a manner that the relationship between the channel size ratio and the pixel electrode area ratio is roughly adjusted and the relationship between the Cgd area ratio and the pixel electrode area ratio is further adjusted.

In Embodiment 1, it is preferred that the value of "Cpix (min)/Cpix(max)" (hereinafter also referred to as response coefficient) is set to be the same among the picture elements. The Cpix(min) denotes pixel capacitance at the time of black display, and the Cpix(max) denotes pixel capacitance at the time of white display. The response coefficient shown as "Cpix(min)/Cpix(max)" is one of the indicators of the response characteristics of liquid crystal. When the values of the response coefficient are different among the picture elements, the response characteristic becomes different for each of the colors, and hence desired chromaticness may not be obtained.

The response coefficient "Cpix(min)/Cpix(max)" can be adjusted by performing, as described above, the adjustment of the channel width of the TFT, the adjustment of the overlapping area of the gate bus line and the drain electrode, the adjustment of the overlapping area of the pixel electrode and the gate bus line, the adjustment of the overlapping area of the pixel electrode and the Cs bus line, and the like.

Figure 51:
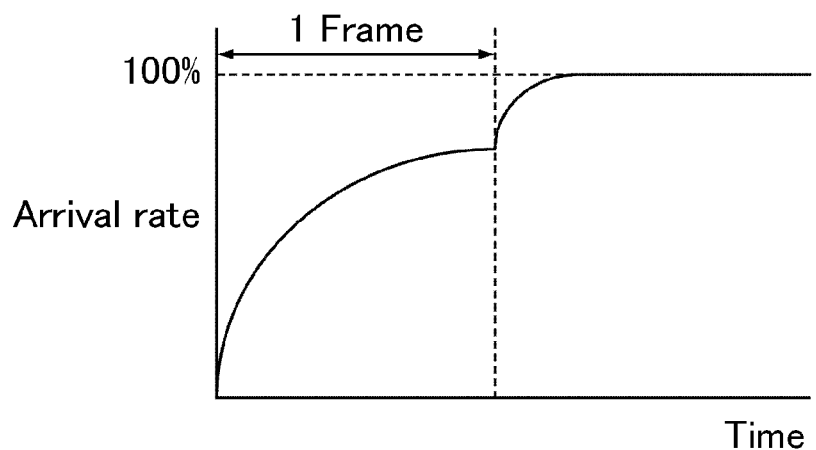
FIG. 51 is a graph showing a relationship between the frame period and the applied voltage arrival rate.
Figure 52:
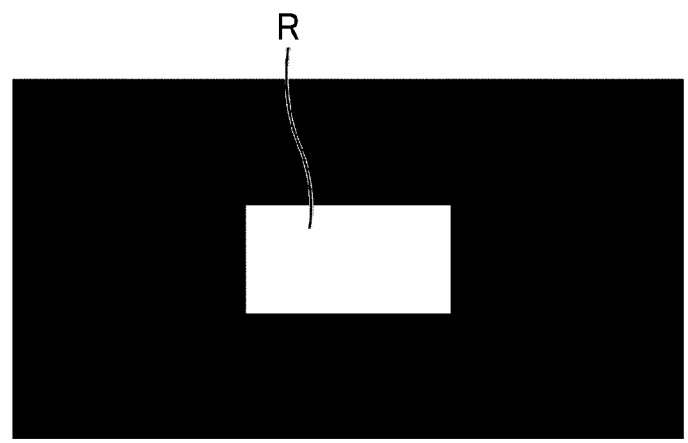
FIG. 52 is a schematic view showing a display state when the influence of the difference in the response coefficient on the display was investigated.

FIG. 51 is a graph showing a relationship between the frame period and the applied voltage arrival rate. FIG. 52 is a schematic view showing a display state when the influence of the difference in the response coefficient on the display was investigated. As shown in FIG. 51, in a liquid crystal display device currently in use, the liquid crystal cannot respond within one frame, and hence the liquid crystal display device is designed to obtain desired transmissivity through two stages. For example, as shown in FIG. 52, when a display is performed such that a white quadrangle is displayed on the black background and then the white quadrangle is moved from the right to the left, the picture elements located at the left end of the quadrangle are made to newly respond in each frame. As a result, only the picture element having a small response coefficient is slow in response, and thereby the intensity of the colors of the other picture elements becomes large so that the chromaticness is changed.

Figure 53:
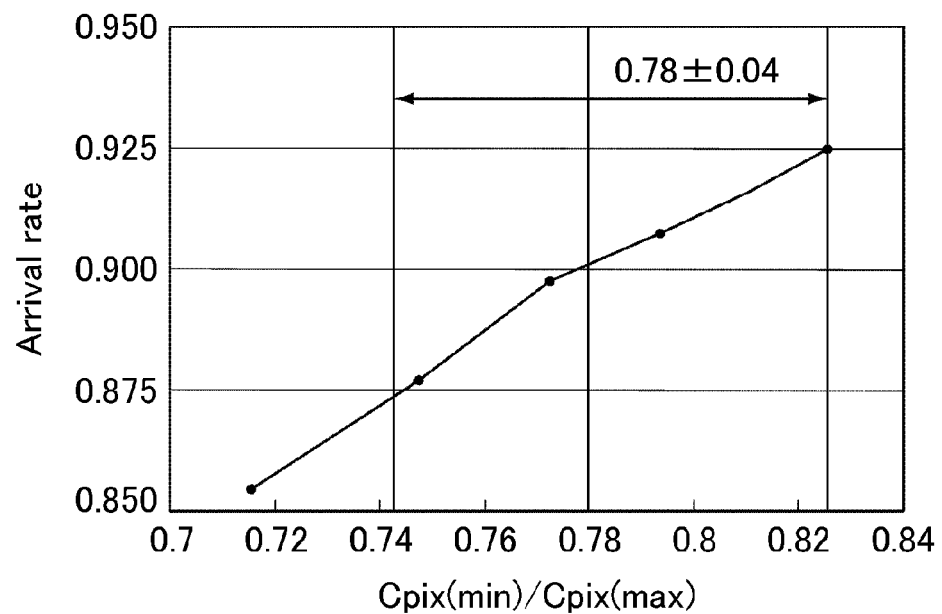
FIG. 53 is a graph showing a suitable range of the response coefficient expressed by "Cpix(min)/Cpix(max)."

To cope with this, the change in the chromaticness can be suppressed by making the values of response coefficients of the picture elements close to each other. FIG. 53 is a graph showing a suitable range of the response coefficient expressed by "Cpix(min)/Cpix(max)." The response coefficient at the time when the arrival rate is 0.9 is 0.78, and the preferred range of the response coefficient is in a range of 0.78±0.04 in which the arrival rate difference is within 5%.

Embodiment 2

Figure 54:
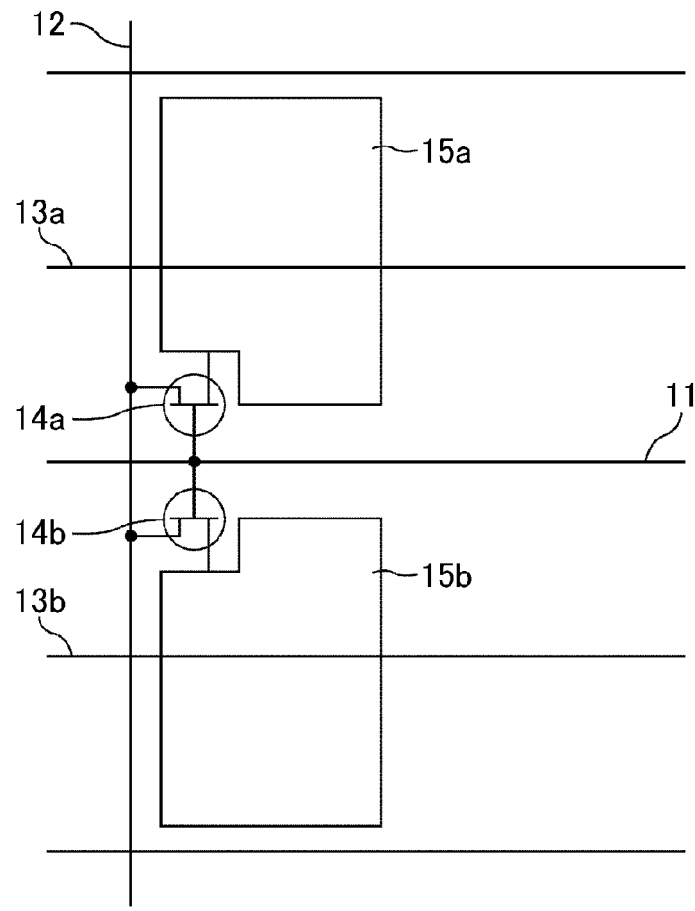
FIG. 54 is a schematic plan view showing an arrangement configuration of pixel electrodes, TFTs and various lines of a liquid crystal display device of Embodiment 2.

FIG. 54 is a schematic plan view showing an arrangement configuration of pixel electrodes, TFTs, and various lines of a liquid crystal display device of Embodiment 2. As shown in FIG. 54, in Embodiment 2, two pixel electrodes (hereinafter also referred to as sub-pixel electrodes) are arranged for one picture element. Further, one pixel is configured by a plurality of picture elements, and each of the picture elements is individually controlled to control each pixel and to further control the whole display of the liquid crystal display device.

The liquid crystal display device of Embodiment 2 includes the gate bus line 11 extended in the row direction (lateral direction), and the source bus line 12 extended in the column direction (longitudinal direction). Further, the liquid crystal display device includes a first TFT 14a and a second TFT 14b each of which are connected to both the gate bus line 11 and the source bus line 12. The first TFT 14a is connected to a first sub-pixel electrode 15a, and the second TFT 14b is connected to a second sub-pixel electrode 15b. Further, the liquid crystal display device of Embodiment 2 includes a first Cs bus line 13a which overlaps at least a part of the first sub-pixel electrode 15a, and a second Cs bus line 13b which overlaps at least a part of the second sub-pixel electrode 15b. As shown in FIG. 54, each of the first Cs bus line 13a and the second Cs bus line 13b is extended in the row direction so as to cross the center of each of the sub-pixel electrodes 15a and 15b.

In Embodiment 2, a kind of color filter is arranged for one picture element. Examples of the kinds, the number and the arrangement order of colors of the picture elements configuring a pixel include, but are not limited in particular to, combinations, such as RGB, RGBY, RGBC, and RGBW. The color of a picture element is determined by a color filter. Examples of arrangement configurations of color filters include a stripe arrangement, as shown in FIG. 3, in which color filters are formed to be extended in the longitudinal direction regardless of the boundary of the pixel electrode, and a two-by-two matrix arrangement, as shown in FIG. 4, in which two of four color filters are arranged in each of the row direction and the column direction.

In Embodiment 2, each of the two sub-pixel electrodes forms sub-pixel capacitance having a different capacitance value. Examples of the method for making the sub-pixel capacitance different for each of the sub-pixel electrodes include (1) a method of supplying a signal voltage from each of different source bus lines, and (2) a method of adjusting the signal voltage by changing the voltage of the Cs bus line. The TFTs are respectively connected to the sub-pixel electrodes. Each of the TFTs is connected to the same gate bus line, and hence the two sub-pixels are simultaneously controlled at the timing at which a scanning signal is supplied to the gate bus line.

Figure 55:
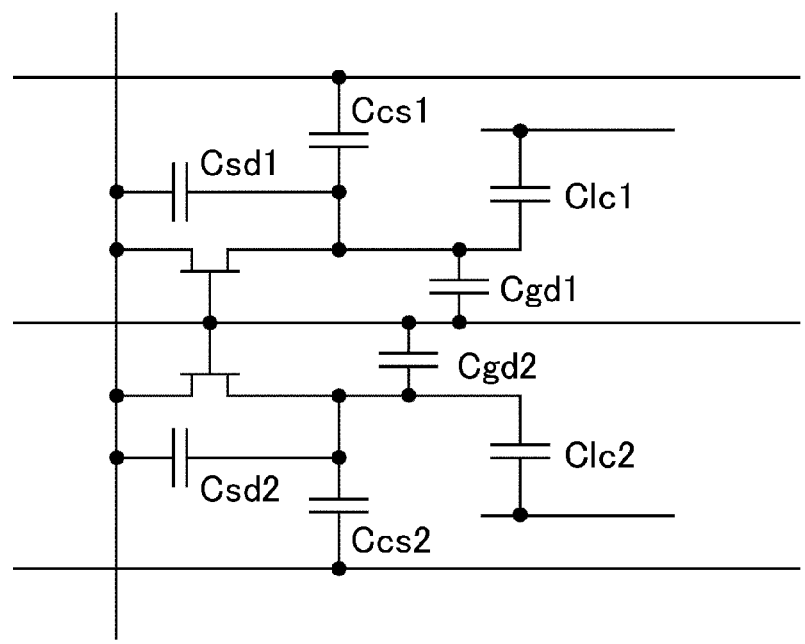
FIG. 55 is an equivalent circuit diagram in the liquid crystal display device of Embodiment 2.

FIG. 55 is an equivalent circuit diagram in the liquid crystal display device of Embodiment 2. In Embodiment 2, a circuit pattern is formed for each of the sub-pixels, and the circuit patterns of the two sub-pixels are shown in FIG. 55. The sub-pixel electrodes respectively form Clc1 and Clc2 between themselves and the counter electrode via the liquid crystal layer. The sub-pixel electrodes respectively form Ccs1 and Ccs2b between themselves and the Cs bus line. Further, each of the sub-pixel electrodes is connected to the drain electrode of each of the TFTs, and the driving of each of the sub-pixels is controlled by each of the TFTs.

The liquid crystal capacitance Clc is formed by the pixel electrode and the counter electrode which are arranged to face each other via the liquid crystal layer. The value of Clc is dependent on the effective voltage (V) applied to the liquid crystal layer by the pair of electrodes. The storage capacitance Ccs is formed by the pixel electrode and the Cs bus line (storage capacitor line) which are arranged to face each other via an insulating layer. The gate-drain capacitance Cgd is formed by the pixel electrode and the gate bus line (scanning line) which are arranged to face each other via an insulating layer. The source-drain capacitance Csd is formed by the pixel electrode and the source bus line (signal line) which are arranged to face each other via an insulating layer.

The method for driving each of the sub-pixel electrodes by using the TFTs, and the basic configuration in Embodiment 2 are the same as those in Embodiment 1.

Figure 56:
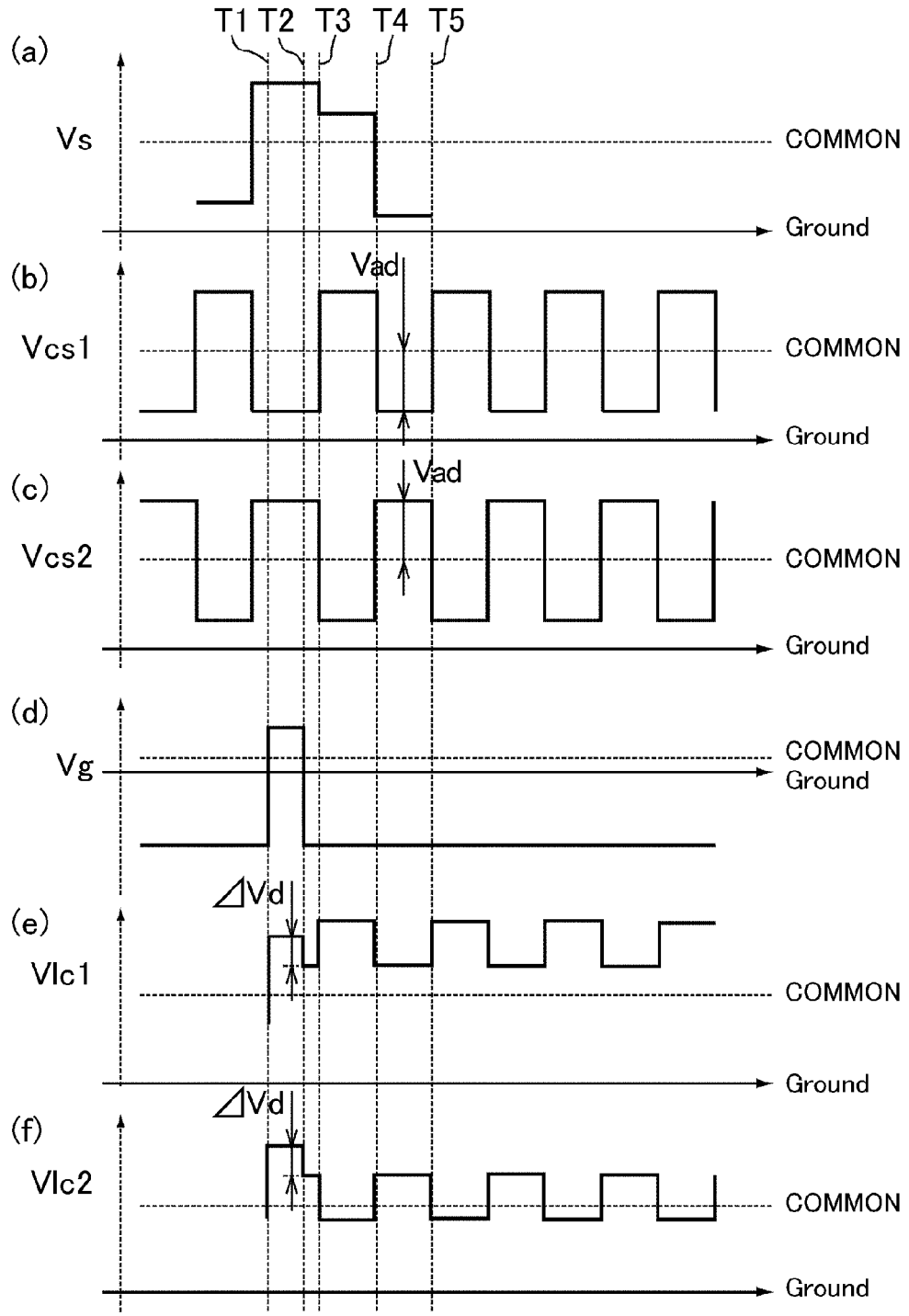
FIG. 56 shows signal waveforms when a multi-pixel drive is performed.

In the following, a method for performing the multi-pixel drive by changing the voltage of the Cs bus line will be described in detail. FIG. 56 shows signal waveforms when the multi-pixel drive is performed.

When a voltage Vg is changed from VgL to VgH at the time of T1, the first TFT 14a and the second TFT 14b are simultaneously switched to conductive state (on-state), so that a voltage Vs is transmitted to each of the first and second sub-pixel electrodes 15a and 15b from the source bus line 12, and is charged to the first and second sub-pixel electrodes 15a and 15b. Similarly, the first and second Cs bus lines 13a and 13b respectively overlapping the first and second sub-pixel electrodes 15a and 15b are also charged by the voltage supplied from the source bus line 12.

Next, when the voltage Vg of the gate bus line 11 is changed from VgH to VgL at the time of T2, the first TFT 14a and the second TFT 14b are simultaneously switched to non-conductive state (off-state), the first and second sub-pixel electrodes 15a and 15b, and the first and second Cs bus lines 13a and 13b are all electrically insulated from the source bus line 12. Note that, immediately after this change, each of the voltages Vlc1 and Vlc2 of the first and second sub-pixel electrodes 15a and 15b is reduced by substantially a same voltage $\Delta Vd$ as follows, due to the through-feed phenomenon caused by the influence of the parasitic capacitance, and the like, associated with the first TFT 14a and the second TFT 14b.

$Vlc1 = Vs - \Delta Vd$ $Vlc2 = Vs - \Delta Vd$

Further, at this time, the voltage Vcs1 and Vcs2 of the first and second Cs bus lines 13a and 13b become as follows.

$Vcs1 = Vcom - Vad$ $Vcs2 = Vcom + Vad$

At the time of T3, the voltage Vcs1 of the first Cs bus line 13a is changed from Vcom−Vad to Vcom+Vad, and the voltage Vcs2 of the second Cs bus line 13b is changed from Vcom+Vad to Vcom−Vad. According to these voltage changes in the first Cs bus line 13a and the second Cs bus line 13b, the voltages Vlc1 and Vlc2 of the first and second sub-pixel electrodes 15a and 15b are changed as follows.

$Vlc1 = Vs - \Delta Vd + 2 \times Vad \times Ccs1/(Clc1 + Ccs1)$ $Vlc2 = Vs - \Delta Vd - 2 \times Vad \times Ccs2/(Clc2 + Ccs2)$ At the time of T4, Vcs1 is changed from Vcom+Vad to Vcom−Vad, and Vcs2 is changed from Vcom−Vad to Vcom+Vad. Before the time T4, the voltages Vlc1 and Vlc2 are respectively expressed as follows.

$Vlc1 = Vs - \Delta Vd + 2 \times Vad \times Ccs1/(Clc1 + Ccs1)$ $Vlc2 = Vs - \Delta Vd - 2 \times Vad \times Ccs2/(Clc2 + Ccs2)$ At the time of T4, also, the voltages Vlc1 and Vlc2 are respectively changed to the voltages expressed as follows.

$Vlc1 = Vs - \Delta Vd$ $Vlc2 = Vs - \Delta Vd$

At the time of T5, Vcs1 is changed from Vcom−Vad to Vcom+Vad, and Vcs2 is changed from Vcom+Vad to Vcom−Vad. Before the time of T5, the voltages Vlc1 and Vlc2 expressed as follows.

$Vlc1 = Vs - \Delta Vd$ $Vlc2 = Vs - \Delta Vd$

At the time of T5, also, the voltages Viol and Vlc2 are respectively changed to the voltages expressed as follows.

$Vlc1 = Vs - \Delta Vd + 2 \times Vad \times Ccs1/(Clc1 + Ccs1)$ $Vlc2 = Vs - \Delta Vd - 2 \times Vad \times Ccs2/(Clc2 + Ccs2)$ For each interval of an integer multiple of horizontal writing time 1H, the voltages Vcs1, Vcs2, Vlc1, and Vlc2 repeat the changes caused at the time of T4 and T5 alternately. Whether the repeating interval of the changes caused at the time of T4 and T5 is set to be equal to the horizontal writing time 1H, or set to twice, 3 times, or more of the horizontal writing time 1H, may be suitably determined in view of the driving method (for example, polarity inversion drive) and displaying conditions (flickering, roughness of display, and the like) of the liquid crystal display device. This repetition is continued until the time equivalent to T1 is subsequently reached. Therefore, the effective values of voltages Vlca and Vlcb of the sub-pixel electrodes become as follows, respectively.

$$Vlca=Vs-\Delta Vd+Vad \times Ccs1/(Clc1+Ccs1)$$

$$Vlcb=Vs-\Delta Vd-Vad \times Ccs2/(Clc2+Ccs2)$$

Therefore, the effective voltages V1 and V2, which are respectively applied to the liquid crystal layer by the first and second sub-pixel electrodes 15a and 15b, are set to values different from each other and expressed as follows.

$$V1=Vlc1-Vcom$$

$$V2=Vlc2-Vcom$$

That is, the effective voltages V1 and V2 are expressed as follows.

$$V1=Vs-\Delta Vd+Vad \times Ccs1/(Clc1+Ccs1)-Vcom$$

$$V2=Vs-\Delta Vd-Vad \times Ccs2/(Clc2+Ccs2)-Vcom$$

Under the above-described premises, the adjustment of the optimum counter voltages between the respective picture elements in Embodiment 2 will be described in detail below.

The plurality of sub-pixel electrodes of the red, green and blue picture elements are formed to have the same total longitudinal length, while the lateral lengths of the sub-pixel electrodes are different from one another. For this reason, the difference in the picture element pitch is reflected, as it is, in the difference in the total area of the sub-pixel electrode among the picture elements.

In Embodiment 2, similarly to Embodiment 1, the balance between the values of α=Cgd/(Cgd+Csd+Ccs+Clc) of the picture elements before performing Cgd gradation is adjusted by using the channel width of TFT. Further, the balance between the values of α=Cgd/(Cgd+Csd+Ccs+Clc) of the picture elements is also adjusted by using the gate-drain overlapping area. As the methods for adjusting the balance between the values of α in Embodiment 2, methods similar to the methods described in Embodiment 1 can be used.

In Embodiment 2, it is preferred that K-values are set to be equal to each other between the sub-pixels. When the K-values are set to be equal to each other, the values of the electrostatic capacitance formed by the respective sub-pixel electrodes are made uniform, and the adjustment between the sub-pixels is more suitably performed. Thereby, it is possible to further reduce the possibility that the value of α is varied among the picture elements. The K-value is expressed as K=Ccs/Cpix(Cgd+Csd+Ccs+Clc). Therefore, the adjustment of Ccs is effective to adjust the balance between the K-values of the picture elements.

Figure 57:
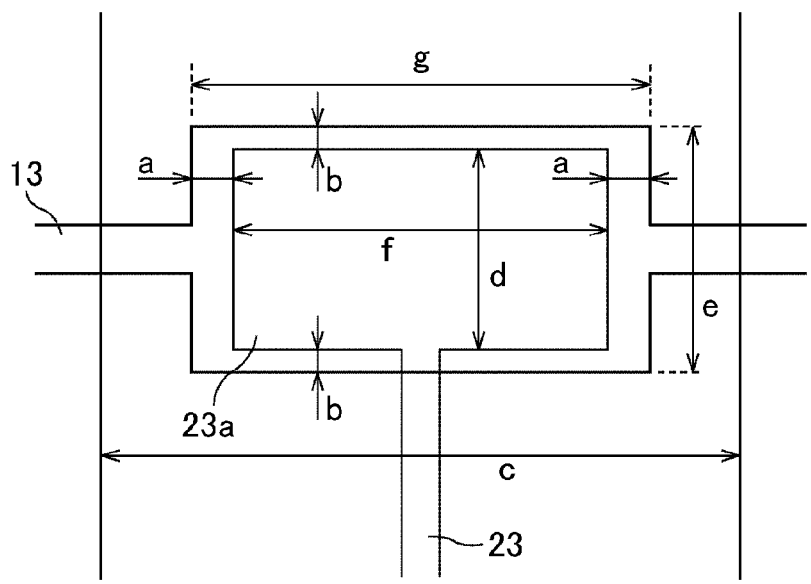
FIG. 57 is a schematic plan view showing a range in which an expanded part of the Cs bus line and an expanded part of the drain electrode overlap each other in Embodiment 2.

FIG. 57 is a schematic plan view showing a range in which the expanded portions of the Cs bus line and of the drain electrode overlap each other in Embodiment 2. As shown in FIG. 57, the Cs bus line 13 has an expanded region in apart thereof, and the drain electrode 23 also has an expanded region in apart thereof. These expanded regions are isolated from each other via an insulating layer, but overlap each other in a plan view so as to form the storage capacitance Ccs. The value of storage capacitance Ccs depends on the overlapping area of these expanded regions, and hence the storage capacitance Ccs having a suitable capacitance value can be formed by adjusting the size of the expanded region for each of the sub-pixels and by adjusting the overlapping degree between the expanded regions. Note that, in FIG. 57, the expanded portion 23a of the Cs bus line 13 is larger than the expanded portion of the drain electrode 23 on both longitudinal and lateral sides.

The longitudinal length and the lateral length of the expanded portion 23a of the drain electrode 23 are denoted by reference characters of d and f, respectively. Further, the longitudinal length and the lateral length of the expanded portion of the Cs bus line 13 are denoted by reference characters of e and g, respectively.

For one side of the expanded portions, the distance between the longitudinal side of the expanded portion of the Cs bus line 13 and the longitudinal side of the expanded portion 23a of the drain electrode 23 is set to a. That is, the expanded portion 23a of the drain electrode 23 is formed on the laterally inner side of the expanded portion of the Cs bus line 13 by the distance a from each of the longitudinal sides of the expanded portion of the Cs bus line 13. Therefore, the equation g=f+2a is established.

For one side of the expanded portions, the distance between the lateral side of the expanded portion of the Cs bus line 13 and the lateral side of the expanded portion 23a of the drain electrode 23 is set to b. That is, the expanded portion 23a of the drain electrode 23 is formed on the longitudinally inner side of the expanded portion of the Cs bus line 13 by the distance b from each of the lateral sides of the expanded portion of the Cs bus line 13. Therefore, the equation e=d+2a is established.

In such case, when, in the four color picture elements having different pitch widths, the pitch widths were set as "red=blue">"green=yellow," the deviation between the K-values (maximum value−minimum value) of the picture elements could be suppressed to 0.10% by respectively adjusting the values of a to g among the picture elements as shown in Table 9 described below. Note that the ratio of the pitch widths of the respective picture elements was set as "red":"blue":"green":"yellow"=1:1:1.4:1.4.

TABLE 9

| | Picture elements R and B (μm) | Picture elements G and Y (μm) |
|---|---|---|
| a | 17.0 | 14.0 |
| b | 3.0 | 2.0 |
| c | 226.0 | 154.25 |
| d | 29.0 | 36.0 |
| e | 35.0 | 40.0 |
| f | 157.0 | 91.25 |
| g | 191.0 | 119.25 |

Figure 58:
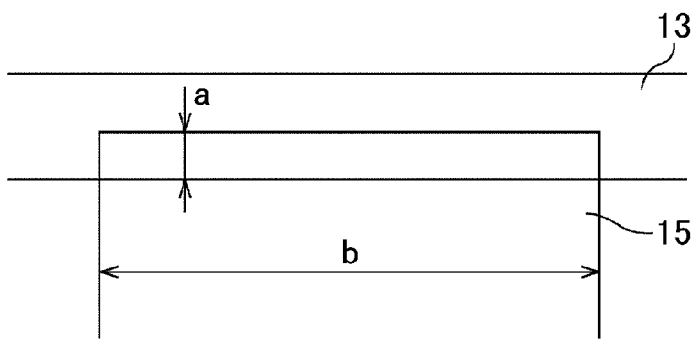
FIG. 58 is a schematic plan view showing an example when the Cs capacitance is adjusted by the overlapping area of the pixel electrode and the Cs bus line.
Figure 59:
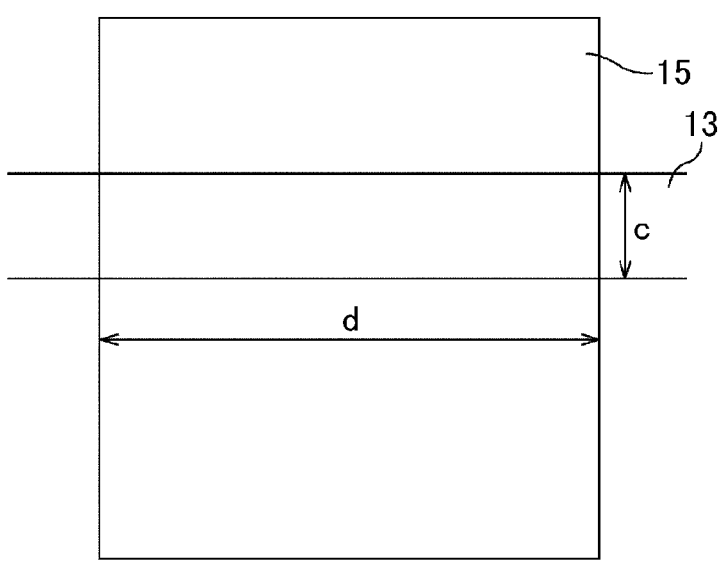
FIG. 59 is a schematic plan view showing an example when the Cs capacitance is adjusted by the overlapping area of the pixel electrode and the Cs bus line.
Figure 60:
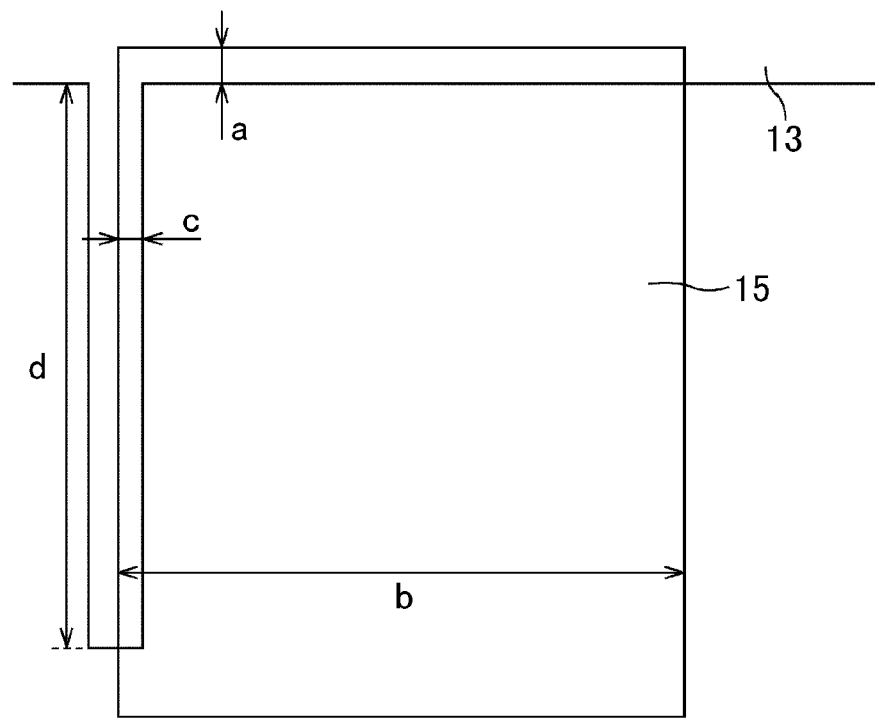
FIG. 60 is a schematic plan view showing an example when the Cs capacitance is adjusted by the overlapping area of the pixel electrode and the Cs bus line.
Figure 61:
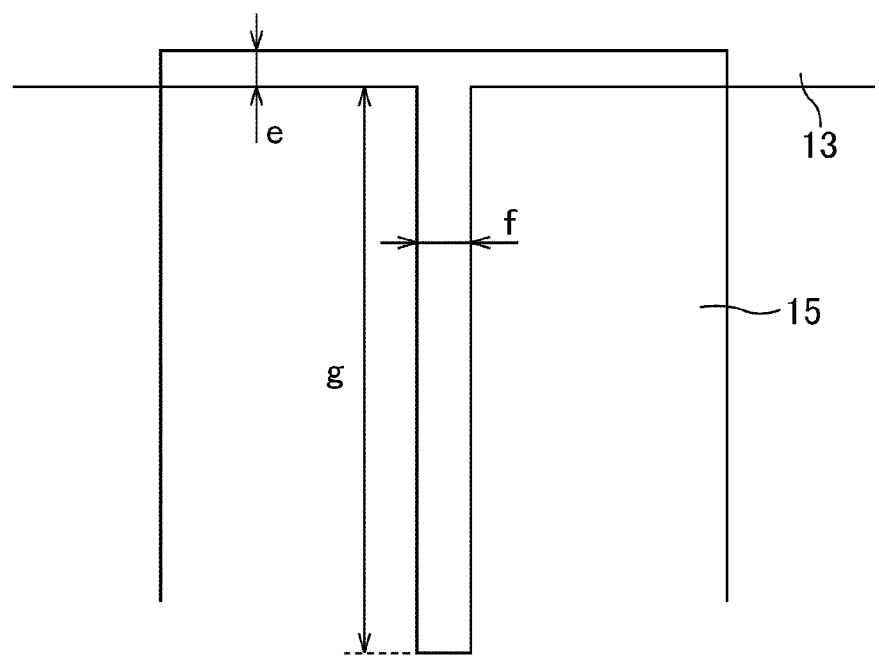
FIG. 61 is a schematic plan view showing an example when the Cs capacitance is adjusted by the overlapping area of the pixel electrode and the Cs bus line.

Each of FIG. 58 to FIG. 61 is a schematic plan view showing an example when the storage capacitance Cs is adjusted by the overlapping area of the pixel electrode and the Cs bus line. FIG. 58 shows a form in which the upper side of the pixel electrode 15 overlaps a part of the Cs bus line 13. The value of the storage capacitance Ccs can be adjusted by adjusting the values of a and b in FIG. 58. FIG. 59 shows a form in which the Cs bus line 13 crosses the center of the pixel electrode 15, and in which the whole in the width direction of the Cs bus line 13 overlaps the pixel electrode 15. The value of the storage capacitance Ccs can be adjusted by adjusting the values of c and d in FIG. 59. FIG. 60 shows a form in which the upper side of the pixel electrode 15 overlaps the Cs bus line 13, and in which an extending section of the Cs bus line 13 is added along with the left side of the pixel electrode 15. The value of the storage capacitance Ccs can be adjusted by adjusting the values of a to d in FIG. 60. FIG. 61 shows a form in which the upper side of the pixel electrode 15 overlaps the Cs bus line 13, and in which an extending section of the Cs bus line 13 is added so as to run the center of the pixel electrode 15 longitudinally. The value of the storage capacitance Ccs can be adjusted by adjusting the values of e to f in FIG. 61.

The values of the storage capacitance Ccs between the sub-pixels are made close to each other by performing these adjustments between the sub-pixels, so that the K-values within a suitable range can be obtained.

Figure 62:
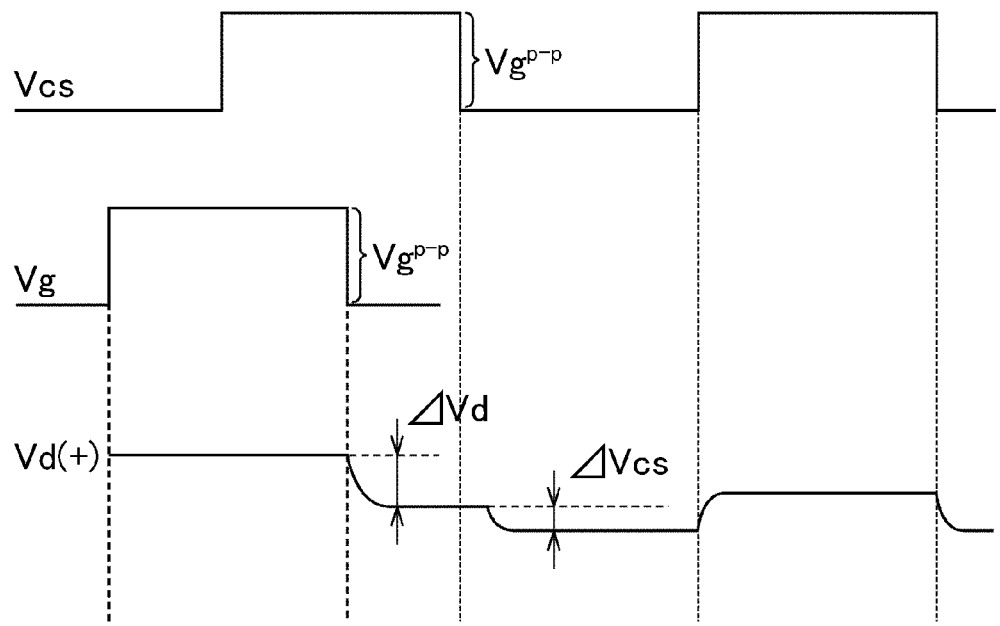
FIG. 62 is a waveform chart showing the Cs amplitude when a multi-drive is performed.

FIG. 62 is a waveform chart showing the amplitude of the voltage of the CS bus line 13 when the multi-drive is performed. The voltage value ΔVcs in FIG. 62 is expressed as ΔVcs=K×Vcs$^{p-p}$. It is preferred that the magnitude of the through-feed voltage of ΔVcs is uniform between the sub-pixels and specifically is 10 mV or less. Thereby, the optimum counter voltages of the sub-pixels can be made close to each other. Since the value of Vcs$^{p-p}$ is substantially fixed, it is preferred that the value of ΔVcs is adjusted by adjusting the value of K.

Table 10 described below is a table showing a permissible range of deviation of the value of K when the value of ΔVcs is assumed to be 10 mV or less. In the conventional liquid crystal display device in which the areas of the picture elements are not made different from each other, the value of K is set in the range of 0.43 to 0.54, and hence the investigation was performed on the basis of this range.

TABLE 10

| K | Deviation of K (%) | Vcs | ΔVcs | Deviation of ΔVcs (mV) |
|---|---|---|---|---|
| 0.54 | 0.74 | 1.92 | 1.04 | 7.7 |
| 0.544 | | 1.92 | 1.04 | |
| 0.43 | 0.93 | 2.41 | 1.04 | 9.6 |
| 0.434 | | 2.41 | 1.04 | |

As shown in Table 10 described above, when the value of K was set to 0.54 and when the deviation of the value of K was set to 0.74%, the deviation of the value of ΔVcs could be suppressed to 7.7 mV. Further, when the value of K was set to 0.43 and when the deviation of the value of K was set to 0.93%, the deviation of the value of ΔVcs could be suppressed to 9.6 mV. Therefore, the target range of the value of K is 1.0% or less.

Embodiment 3

In Embodiment 3, three color picture elements of red, green and blue, or four color picture elements of red, green, blue and yellow are used, and one pixel is configured by a combination of these picture elements. Note that, in Embodiment 3, the kinds, the number, and the arrangement order of colors of the picture elements are not limited in particular.

Figure 63:
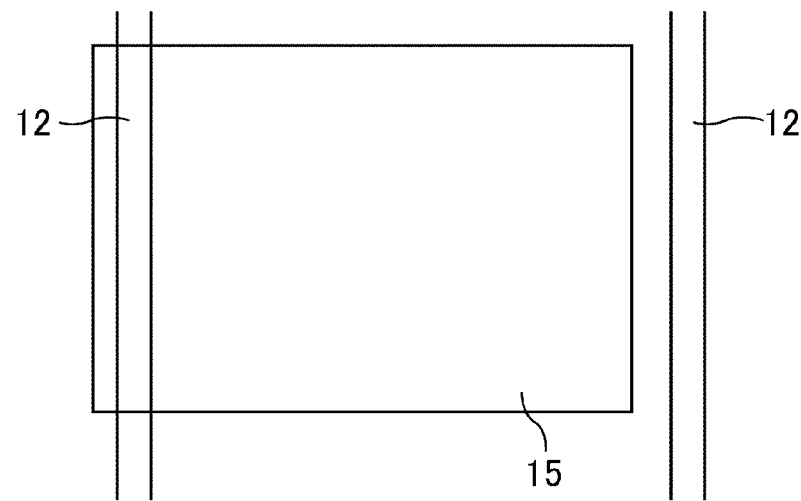
FIG. 63 is a schematic plan view showing an arrangement configuration of pixel electrodes and lines in Embodiment 3.

FIG. 63 is a schematic plan view showing an arrangement configuration of pixel electrodes and lines in Embodiment 3. In the liquid crystal display device of Embodiment 3, both two source bus lines extended in the longitudinal direction respectively overlap end portions of one of a plurality of pixel electrodes arranged in one pixel. On the other hand, as shown in FIG. 63, only one of the two source bus lines 12 extended in the longitudinal direction overlaps the end portion of each of the other pixel electrodes 15, and the other source bus line 12 does not overlap the end portion of each of the other pixel electrodes 15.

For example, this configuration is adopted in such a case where a columnar spacer is arranged in the picture element or where the source-drain capacitance Csd is reduced, and where it is necessary that the area of the pixel electrode is reduced and that the source line is made to overlap only one end portion of the pixel electrode. When the area of the pixel electrode is reduced only in one picture element, or when the overlapping state of the source line and the pixel electrode is different for each of the picture elements, the optimum counter voltage is different for each of the picture elements, and hence the image sticking easily occurs.

To cope with this, in Embodiment 3, the pixel capacitance among the picture elements or between the sub-pixels is adjusted by means similar to the means shown in Embodiment 1 and Embodiment 2. Note that, in Embodiment 3, the pitch widths of the picture elements are not limited in particular, and may be different from each other or may be the same.

Embodiment 4

In Embodiment 4, three color picture elements of red, green and blue, or four color picture elements of red, green, blue and yellow are used, and one pixel is configured by a combination of these picture elements. Note that, in Embodiment 4, the kinds, the number, and the arrangement order of colors of the picture elements are not limited in particular.

Figure 64:
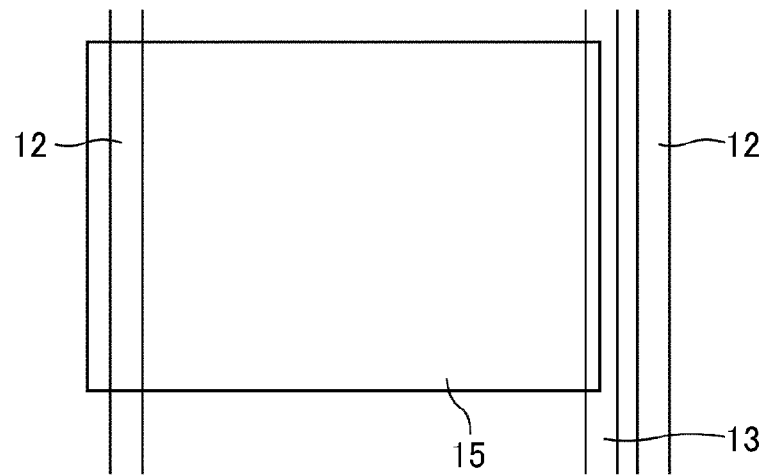
FIG. 64 is a schematic plan view showing an arrangement configuration of pixel electrodes and lines in Embodiment 4.

FIG. 64 is a schematic plan view showing an arrangement configuration of a pixel electrode and lines in Embodiment 4. In the liquid crystal display device of Embodiment 4, both two source lines extended in the longitudinal direction respectively overlap end portions of one of a plurality of pixel electrodes arranged in one pixel. On the other hand, as shown in FIG. 64, only one of the two source bus lines 12 extended in the longitudinal direction overlaps the end portion of each of the other pixel electrodes 15, and the other source bus line 12 does not overlap the end portion of each of the pixel electrode 15. Further, next to the source bus line 12 not overlapping the pixel electrode 15, the Cs bus line 13 is extended in the longitudinal direction and overlaps the other end portion of the pixel electrode 15.

For example, this configuration is adopted in such a case where a columnar spacer is arranged in the picture element or the source-drain capacitance Csd is reduced, and where it is necessary that the area of the pixel electrode is reduced and also the source line is made to overlap only one end portion of the pixel electrode, and that not the source line but only the Cs line is made to overlap the other end portion of the picture element. When the area of the pixel electrode is reduced only in one picture element, or when the overlapping state of the source and Cs lines and the pixel electrode is different for each of the picture elements, the optimum counter voltage is different for each of the picture elements, and hence the image sticking easily occurs.

To cope with this, in Embodiment 4, the pixel capacitance among the picture elements or between the sub-pixels is adjusted by means similar to the means shown in Embodiment 1 and Embodiment 2. Note that, in Embodiment 4, the pitch widths of the picture elements are not limited in particular, and may be different from each other or may be the same.

Embodiment 5

In Embodiment 5, three color picture elements of red, green and blue, or four color picture elements of red, green, blue and yellow are used, and one pixel is configured by a combination of these picture elements. Note that, in Embodiment 5, the kinds, the number, and the arrangement order of colors of the picture elements are not limited in particular.

Figure 65:
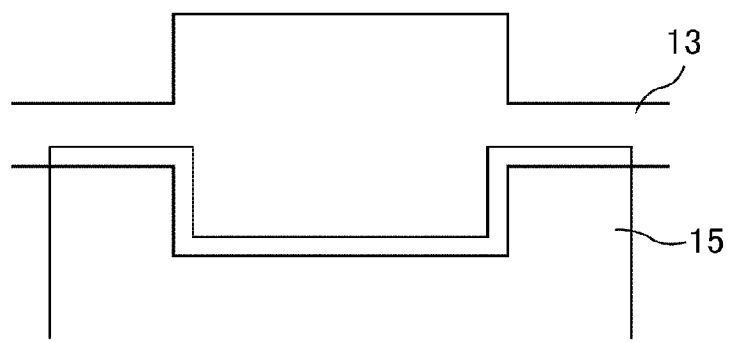
FIG. 65 is a schematic plan view showing an arrangement configuration of pixel electrodes and lines in Embodiment 5.

FIG. 65 is a schematic plan view showing an arrangement configuration of a pixel electrode and a line in Embodiment 5. In the liquid crystal display device of Embodiment 5, the Cs line is extended in the lateral direction so as to overlap the upper end portion of one of a plurality of pixel electrodes arranged in one pixel, and the Cs line is not formed in a linear shape but is formed to have an expanded region in a part thereof. On the other hand, as shown in FIG. 65, the Cs bus line 13 is extended in the lateral direction so as to overlap the upper portion of each of the other pixel electrodes 15. The Cs bus line 13 is not formed in a linear shape but is formed to have an expanded region in a part thereof, while the upper side of the pixel electrode 15 is not formed in a linear shape but is formed to have an inwardly recessed shape. Thereby, the overlapping area of the pixel electrode 15 and the Cs bus line 13 is different for each of the picture elements, and the area of the pixel electrode 15 is also different for each of the picture elements.

For example, in such a case where a columnar spacer is arranged in the picture element or where the storage capacitance Ccs is reduced, when the area of the pixel electrode is reduced and also the arrangement configuration of the pixel electrode and the Cs line is made different for each of the picture elements or when the pixel electrode area is made different for each of the picture elements, the optimum counter voltage becomes different for each of the picture elements, and hence the image sticking easily occurs.

To cope with this, in Embodiment 5, the pixel capacitance among the picture elements or between the sub-pixels is adjusted by means similar to the means shown in Embodiment 1 and Embodiment 2. Note that, in Embodiment 5, the pitch widths of the picture elements are not limited in particular, and may be different from each other or may be the same.

Embodiment 6

Figure 66:
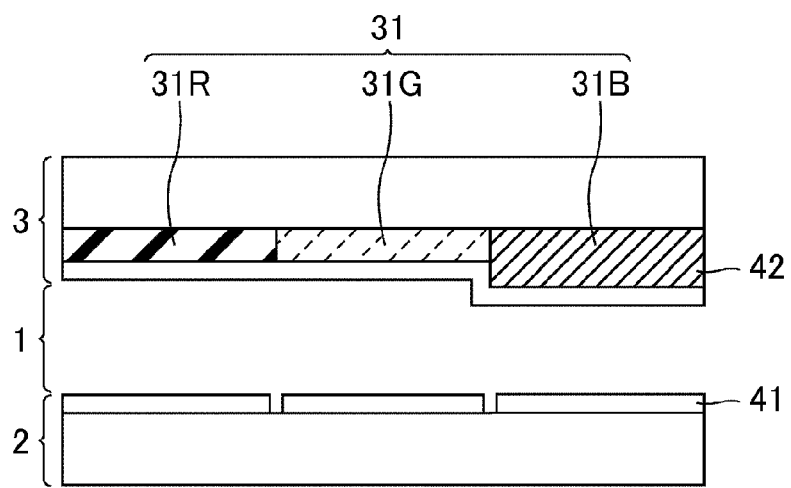
FIG. 66 is a schematic cross-sectional view showing a form in which picture elements of three colors are used in Embodiment 6.
Figure 67:
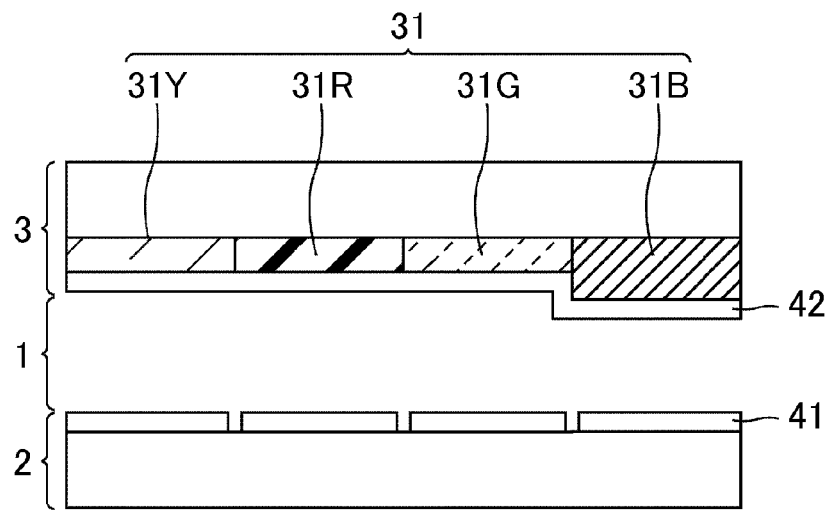
FIG. 67 is a schematic cross-sectional view showing a form in which picture elements of four colors are used in Embodiment 6.
Figure 68:
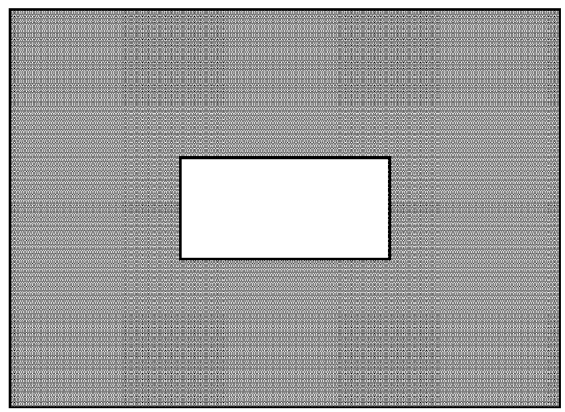
FIG. 68 is a schematic view showing a state in which a white window is displayed on a halftone background.
Figure 69:
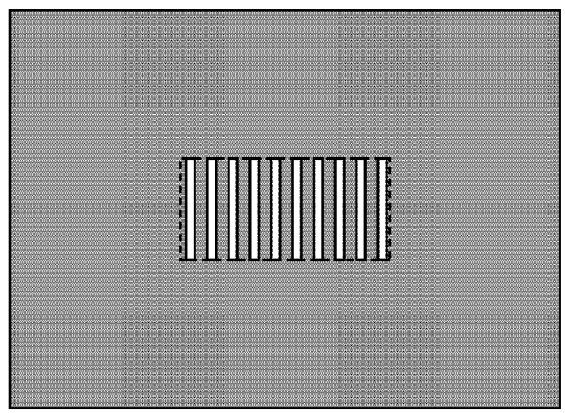
FIG. 69 is a schematic view showing a state of a halftone solid display after the white window is eliminated.
Figure 70:
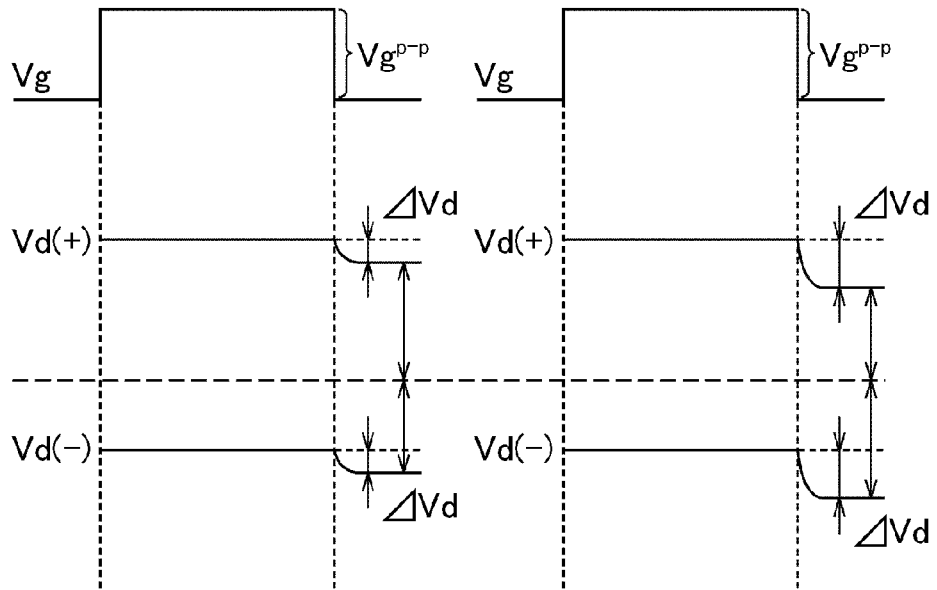
FIG. 70 is a schematic view showing signal waveforms of the drain voltages of two pixel electrodes arranged adjacently to each other.
Figure 71:
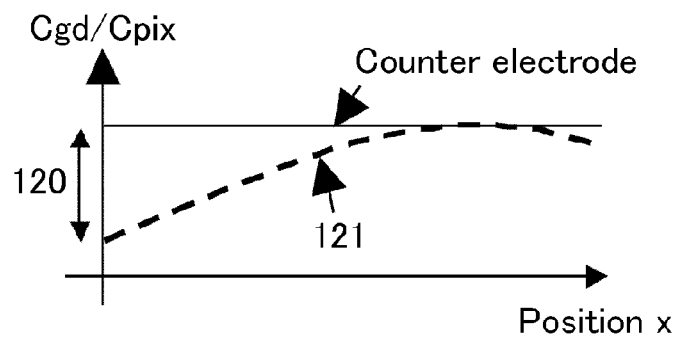
FIG. 71 is a graph showing an in-plane counter voltage distribution in a liquid crystal display device in the case of not performing Cgd gradation.
Figure 72:
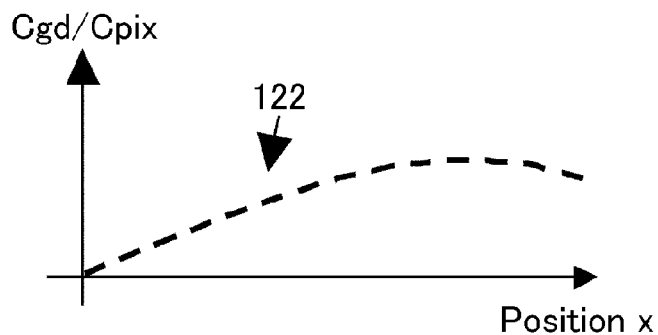
FIG. 72 is a graph showing a Cgd gradation performed in a liquid crystal display device.
Figure 73:
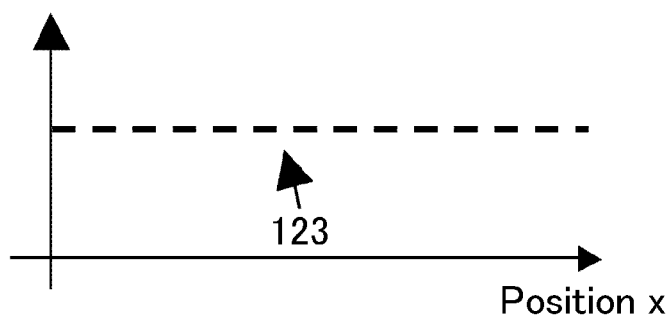
FIG. 73 is a graph showing an in-plane counter voltage distribution in a conventional liquid crystal display device in the case of performing Cgd gradation.

Each of FIG. 66 and FIG. 67 is a schematic cross-sectional view showing a liquid crystal layer in Embodiment 6. In Embodiment 6, three color picture elements of red, green and blue, or four color picture elements of red, green, blue and yellow are used, and one pixel is configured by a combination of these picture elements. FIG. 66 is a schematic cross-sectional view showing a form in which three color picture elements are used in Embodiment 6, and FIG. 67 is a schematic cross-sectional view showing a form in which four color picture elements are used in Embodiment 6.

As shown in FIG. 66 and FIG. 67, a liquid crystal layer 1 provided in the liquid crystal display device of Embodiment 6 is arranged between a pair of substrates composed of an active matrix substrate 2 and a color filter substrate 3. The active matrix substrate 2 includes pixel electrodes 41, and the color filter substrate 3 includes a counter electrode 42. Further, the color filter substrate 3 includes a color filter 31 of a plurality of colors, and one pixel is formed of three or four colors. FIG. 66 shows a form in which three color filters of a red color filter 31R, a green color filter 31G, and a blue color filter 31B are used, and FIG. 67 shows a form in which four color filters of a red color filter 31R, a green color filter 31G, a blue color filter 31B, and a yellow color filter 31Y are used.

In Embodiment 6, the thickness (cell gap) of the liquid crystal layer 1 corresponding to the blue picture element is formed to be smaller than the thickness (cell gap) of the liquid crystal layer 1 corresponding to other picture elements. Thereby, more excellent view angle characteristics can be obtained as compared with the case where the thickness of the liquid crystal layer 1 is the same for each of the picture elements.

In Embodiment 6, the voltage applied to the liquid crystal layer 1 by the electrodes 41 and 42 respectively provided on the pair of substrates is made different for each of the picture elements. This is because, in Embodiment 6, the thickness of the liquid crystal layer 1 of the blue picture element is set smaller than the thickness of the liquid crystal layer 1 of the other picture elements, and thereby the liquid crystal capacitance formed in the blue picture element becomes larger than the liquid crystal capacitance formed in the other picture elements. For this reason, the optimum counter voltage is made different among the picture elements when a multi gap structure is provided.

In Embodiment 6, the optimum counter voltage is adjusted among the picture elements by using the channel width of the TFT, and the optimum counter voltage is further adjusted by adjusting the cell gap among the picture elements. Thereby, before performing Cgd gradation, it is possible to further suppress the variation in the values of α among the picture elements.

The above-mentioned modes may be employed in appropriate combination as long as the combination is not beyond the spirit of the present invention.

The present application claims priority to Patent Application No. 2010-043425 filed in Japan on Feb. 26, 2010 under the Paris Convention and provisions of national law in a designated State, the entire contents of which are hereby incorporated by reference.

REFERENCE SIGNS LIST

1: Liquid crystal layer
2: Active matrix substrate
3: Color filter substrate
11: Gate bus line (scanning line)
12: Source bus line (signal line)
13: Cs bus line (storage capacitor line)
13a: First Cs bus line
13b: Second Cs bus line
14: TFT (Thin film transistor)
14a: First TFT
14b: Second TFT
15: Pixel electrode
15a: First sub-pixel electrode
15b: Second sub-pixel electrode
21: Channel region
22: Source electrode
23: Drain electrode
23a: Expanded section of drain electrode
24: Contact hole
25: Gate electrode
26: Variable portion of gate electrode
31: Color filter
31R: Color filter (red)
31G: Color filter (green)
31B: Color filter (blue)
31Y: Color filter (yellow)
41: Pixel electrode
42: Counter electrode
101, 103, 113, 121, 123: In-plane counter voltage distribution
102, 112, 122: Cgd gradation
131: Pixel of Step (n)
132: Pixel of Step (n+1)
133: Mosaic region

The invention claimed is:
1. A liquid crystal display device which comprises a pair of substrates and a liquid crystal layer sandwiched between the pair of substrates, and is configured such that a pixel is formed by picture elements of a plurality of colors, wherein one of the pair of substrates includes scanning lines, signal lines, storage capacitor lines, thin film transistors connected to both of the scanning lines and the signal lines, and pixel electrodes connected to the thin film transistors;

the other of the pair of substrates includes a counter electrode;

the pixel electrodes are arranged for the picture elements;

a scanning line and a pixel electrode form a gate-drain capacitance;

the gate-drain capacitance formed by a pixel electrode with a larger pixel capacitance among the pixel electrodes arranged in one pixel is larger than the gate-drain capacitance formed by a pixel electrode with a smaller pixel capacitance among the pixel electrodes arranged in the one pixel;

an overlapping area of each of the pixel electrodes overlapped with the scanning line initially increases in a travelling direction of a scanning line signal but a rate of the increase subsequently decreases, in each of the pixel electrodes respectively arranged for the picture elements of single colors; and the rates of the increase are different among the pixel electrodes with different pixel capacitances.

2. The liquid crystal display device according to claim 1, wherein the pixel electrode with a larger pixel capacitance among the pixel electrodes arranged in one pixel is connected to a thin film transistor with a larger channel width.

3. The liquid crystal display device according to claim 1, wherein the pixel electrode with a larger pixel capacitance among the pixel electrodes arranged in one pixel has a larger overlapping area with the scanning line.

4. The liquid crystal display device according to claim 1, wherein the area of the pixel electrode with a larger pixel capacitance is different in size from the area of the pixel electrode with a smaller pixel capacitance.

5. The liquid crystal display device according to claim 1, wherein the liquid crystal layer overlapped with the pixel electrode with a larger pixel capacitance differs in thickness from the liquid crystal layer overlapped with the pixel electrode with a smaller pixel capacitance.

6. The liquid crystal display device according to claim 1, wherein a signal line and a pixel electrode form a source-drain capacitance;

a storage capacitor line and a pixel electrode form a storage capacitance;

a pixel electrode and a counter electrode form a liquid crystal capacitance;

ratios of the gate-drain capacitance to the total of the gate-drain capacitance, the source-drain capacitance, the storage capacitance, and the liquid crystal capacitance are different among the picture elements of the plurality of colors; and the difference between the largest ratio of the gate-drain capacitance and the smallest ratio of the gate-drain capacitance, among the ratios of the gate-drain capacitances for each picture element with different colors, is 10% or less of the smallest ratio of the gate-drain capacitance.

7. The liquid crystal display device according to claim 1, wherein a signal line and a pixel electrode form a source-drain capacitance;

a storage capacitor line and a pixel electrode form a storage capacitance;

a pixel electrode and a counter electrode form a liquid crystal capacitance;

a response coefficient calculated, in the one picture element, from ratios of the minimum value of the total of the gate-drain capacitance, the source-drain capacitance, the storage capacitance, and the liquid crystal capacitance, with respect to the maximum value of the total of the gate-drain capacitance, the source-drain capacitance, the storage capacitance, and the liquid crystal capacitance are different among the picture elements of the plurality of colors; and the difference between the largest response coefficient and the smallest response coefficient is 5% or less of the smallest response coefficient, among the response coefficients respectively obtained for each picture element with different colors.

8. The liquid crystal display device according to claim 1, wherein each of the pixel electrodes is divided into two or more pieces in one picture element;

the thin film transistors are connected to the divided pieces of the pixel electrode; and the storage capacitor lines are overlapped with the pixel electrodes, and a polarity of a voltage is inverted at a regular time interval.

9. The liquid crystal display device according to claim 8, wherein a signal line and a pixel electrode form a source-drain capacitance;

a storage capacitor line and a pixel electrode form a storage capacitance;

a pixel electrode and a counter electrode form a liquid crystal capacitance;

ratios of the storage capacitance to a total of the gate-drain capacitance, the source-drain capacitance, the storage capacitance, and the liquid crystal capacitance are different among the picture elements of the plurality of colors; and the difference between the largest ratio of the storage capacitance and the smallest ratio of the storage capacitance, among the ratios of the storage capacitance for each picture element with different colors, is 1.0% or less of the smallest ratio of the storage capacitance.

* * * * *